United States Patent
Yu et al.

(10) Patent No.: US 11,506,626 B2
(45) Date of Patent: Nov. 22, 2022

(54) ELECTRODE HAVING HIERARCHICAL STRUCTURE, A SENSOR FOR DETECTING GLUCOSE INCLUDING THE ELECTRODE, AND A METHOD FOR PREPARING THE ELECTRODE

(71) Applicant: DAEGU GYEONGBUK INSTITUTE OF SCIENCE AND TECHNOLOGY, Daegu (KR)

(72) Inventors: Jong Sung Yu, Seoul (KR); Chunfei Zhang, Sejong-si (KR)

(73) Assignees: DAEGU GYEONGBUK INSTITUTE OF SCIENCE AND TECHNOLOGY, Seoul (KR); GLOBAL FRONTIER CENTER FOR MULTISCALE ENERGY SYSTEMS, Seoul (KR)

( * ) Notice: Subject to any disclaimer, the term of this patent is extended or adjusted under 35 U.S.C. 154(b) by 299 days.

(21) Appl. No.: 16/295,166

(22) Filed: Mar. 7, 2019

(65) Prior Publication Data
US 2019/0277794 A1    Sep. 12, 2019

(30) Foreign Application Priority Data
Mar. 8, 2018 (KR) .................. 10-2018-0027291

(51) Int. Cl.
*G01N 27/327* (2006.01)
*G01N 27/333* (2006.01)

(52) U.S. Cl.
CPC ..... *G01N 27/3271* (2013.01); *G01N 27/3275* (2013.01); *G01N 27/333* (2013.01)

(58) Field of Classification Search
CPC ............. G01N 27/3271; G01N 27/333; G01N 27/3275
See application file for complete search history.

(56) References Cited

FOREIGN PATENT DOCUMENTS

KR    10-1765844 B1    8/2017

OTHER PUBLICATIONS

L. Wang, et al., Three-dimensional Ni(OH)2 nanflakes/graphene/nickel foam electrode with high rate capability for supercapacitor applications, International Journal of Hydrogen Energy 2014 (39), p. 7876-84. (Year: 2014).*

(Continued)

*Primary Examiner* — Luan V Van
*Assistant Examiner* — Caitlyn Mingyun Sun
(74) *Attorney, Agent, or Firm* — Harness, Dickey & Pierce, P.L.C.

(57) ABSTRACT

An electrode composed of a substrate including a graphene layer coated on a first metal; and a complex including a second metal deposited on the substrate and a hydroxide of the first metal, where the complex is in the form of core-shell in which the second metal is a core and the hydroxide of the first metal is a shell, and the second metal has a higher standard reduction potential than the first metal. The graphene-coated metal foam of the present invention is the first case that proves not only theoretically but also by experiment that the remarkable catalytic ability reducing other metals (Au, Pt, Ag, and Cu, etc.) with a higher reduction potential than the metal by graphene coated on the metal surface it electroless deposition without additional reductant or electrical reduction conditions is due to the electrical double layer or interfacial dipole induced between the graphene and the metal.

14 Claims, 45 Drawing Sheets

(56) References Cited

OTHER PUBLICATIONS

R. Yuksel, et al., Felxible, silver nanowire network nickel hydroxide core-shell electrodes for supercapacitors, Journal of Power Sources 2016 (328) p. 167-73. (Year: 2016).*

L. Yang, Graphene-Supported Ag-Based Core-Shell Nanoparticles for Hydrogen Generation in Hydrolysis of Ammonia Borane and Methylamine Borane, Applied Materials & Interfaces, 2013(5), p. 8231-40. (Year: 2013).*

C. Zhang, Catalytic mechanism of graphene-nickel interface dipole layer for binder free electrochemical sensor applications, Nature Communications Chemistry, 2018 1:94, p. 1-10. (Year: 2018).*

Zhang, Nature Communications Chemistry Publication Date. (Year: 2022).*

L. Wang, et al., Three-dimensional Ni(OH)2 nanoflakes/graphene/nickel foam electrode with high rate capability for supercapacitor applications, International Journal of Hydrogen Energy 2014 (39), p. 7876-84. (Year: 2014).*

R. Yuksel, et al., Flexible, silver nanowire network nickel hydroxide core-shell electrodes for supercapacitors, Journal of Power Sources 2016 (328) p. 167-73. (Year: 2016).*

Debasis Ghosh, et al.; "Graphene decorated with Ni(OH)2 and Ag deposited Ni(OH)2 stacked nanoplate for supercapacitor application"; Chemical Physics Letters; vol. 573; 2013; pp. 41-47.

Bo Zhao et al.; "NiO mesoporous nanowalls grown on RGO coated nickel foam as high performance electrodes for supercapacitors and biosensors"; Electrochimica Acta; vol. 192; 2016; pp. 205-215.

\* cited by examiner

ELECTRODE HAVING HIERARCHICAL STRUCTURE, A SENSOR FOR DETECTING GLUCOSE INCLUDING THE ELECTRODE, AND A METHOD FOR PREPARING THE ELECTRODE

FIELD

The present invention relates to an electrode having a hierarchical structure, a sensor for detecting glucose including the electrode, and a method for preparing the electrode above.

BACKGROUND

It has widely known that the conjugation of metal nanoparticles or other compounds with graphene is a possible strategy to prepare a highly active catalyst. The unique properties of graphene such as high conductivity, transparency, 2D morphology and high stability in acid and alkali solutions make graphene an excellent electron transfer medium at the interface of graphene/active material as a catalyst. In particular, a graphene/metal nanoparticle (G/MNP) complex is more attractive due to its significantly improved catalytic properties, partially due to synergistic effects from the interface of graphene and active site. However, it is not known where this synergistic effect is originated. In general, the metal ions such as $Au^{3+}$, $Pt^{4+}$, $Ag^+$ and $Cu^{2+}$ ($M^{x+}$) are in-situ converted to MNPs on the surface of graphene by using a reducing agent or by electro deposition in order to produce a G/MNP complex. On other hand, unlike chemical reduction using general reducing agents or electro deposition under reducing conditions, the metals such as Ag or Au, which have a higher reduction potential than copper metals articles on the graphene substrate, can be auto-deposited on the copper particles loaded on the substrate as MNPs through galvanic displacement mechanism. It has been reported that graphene and carbon nanotube (CNT) are oxidized by a strong oxidant such as $Au^{3+}$ and $Pt^{4+}$, so that they can be doped by Au and Pt in $HAuCl_4$ ($Au^{3+}$) and $Na_2PtCl_6$ ($Pt^{4+}$) solutions respectively. However, this method is not widely used because such metal ions having weak oxidizing power (e.g., $Ag^+$ and $Cu^{2+}$) cannot be reduced by graphene and CNT.

According to the galvanic displacement mechanism, some metal ions can be reduced by nickel through electroless deposition, but the reduction potential of the metal above should be higher than nickel ($Ni^{2+}/Ni$, $-0.257$ V vs. SHE), which is an essential condition for causing a displacement reaction. Thus, $Cu^{2+}$ ($Cu^{2+}/Cu$, 0.342V vs. SHE), $Ag^+$ ($Ag^+/Ag$, 0.799 V vs. SHE), $Pt^{4+}$ ($[PtCl_6]^{2-}/[PtCl_4]^{2-}$, 0.68 V vs. SHE; $[PtCl_4]^{2-}/Pt$, 0.755 V vs. SHE), and $Au^{3+}$ ($[AuCl_4]^-/Au$, 1.002 V vs. SHE) can be reduced to Cu, Ag, Pt, and Au, respectively, by nickel. Ni foam has an excellent conductivity and a porous structure, based on which many attempts have been made to load various metals on the Ni foam. In particular, the method to load an active material directly on a conductive structure is a very effective way to eliminate the binder induced resistance. However, there is no case in which nickel and graphene are used together to form a complex reactive structure that would be used for direct chemical conversion. In the present invention, Ni foam was coated with grapheme (graphene-coated Ni foam: GNF) by chemical vapor deposition (CVD) and the prepared GNF was used for the direct deposition of MNP (Au, Pt, Ag, and Cu) for the first time. Surprisingly, unlike the pure Ni foam, GNF was able to accelerate electroless reduction of $M^{x+}$ ions significantly on the surface of graphene. More interestingly, MNP deposition and $Ni(OH)_2$ nanosheet assembly were simultaneously occurred on GNF. When the catalytic mechanism is investigated more carefully, it can reveal the catalytic mechanism of graphene in other applications such as graphene-based photocatalysis and can be also an important reference for the design of highly active catalysts.

The hierarchical structure of $Ni(OH)_2$-wrapped Ag surrounded by Ni(OH)2 [Ag@Ni(OH)$_2$] is a binderless composite material which favors the electrochemical sensing electrode reaction. $Ni(OH)_2$ displays excellent electrical catalytic properties for glucose and has been studied for a long time to develop an electrochemical sensor due to its low cost, high selectivity and low detection limit. To detect glucose, glassy carbon electrode is often applied as a basic platform for current collection. However, the surface area for supporting an active material is limited. Unfortunately, a binder is generally used to fix $Ni(OH)_2$ on a current collector and therefore contact resistance is necessarily increased. In addition, the low conductivity of metal oxides or hydroxides significantly decreases the performance. The secondary structure of the active material and contact state with the current collector play key role in the electrode performance. In particular, the hierarchical structure of the active material can increase the surface area significantly, shorten the electron mobility path, and generate more active sites in the electrode. Therefore, the hierarchical structure of Ag@Ni (OH)$_2$ without a binder has many advantages as an electrochemical sensing electrode. In general, the performance of a sensor depends significantly on the electrochemical reaction occurred at the electrode. Therefore, the development of a structure-functionalized electrode design favorable for the certain electrochemical reaction will be a great challenge for the preparation of an electrochemical sensor.

In this invention, Ag@Ni(OH)$_2$ hybrid structure was grown on GNF (Ag@Ni(OH)$_2$-GNF). The Ag@Ni(OH)$_2$-GNF complex above has a unique structure to overcome the problems above.

It consists of a $Ni(OH)_2$ shell for fast molecular diffusion in electrolyte, a highly conductive silver core internally grown for current collection, and a GNF support with a large surface area for active material loading to form an excellent and sensitive platform for chemical or biological species detection. So, the said Ag@Ni(OH)$_2$-GNF complex was used directly herein as a binderless electrode for the detection of glucose without an enzyme. It is also expected that the Ag@Ni(OH)$_2$-GNF complex can be effectively applied in various fields.

In relation to the above, Korean Patent No. 10-1765844 describes an nickel/cobalt oxide-based electrode for elements measurement and a preparation method of the same.

SUMMARY

It is an object of the present invention to provide an electrode having a hierarchical structure, a sensor for detecting glucose including the electrode, and a method for preparing the electrode above.

To achieve the object above, in a first aspect of the present invention, the present invention provides an electrode composed of a substrate including a graphene layer coated on a first metal; and a complex comprising a second metal deposited on the substrate and a hydroxide of the first metal, wherein the complex is in the form of core-shell in which the second metal is a core and the hydroxide of the first metal is a shell, and the second metal has a higher standard reduction potential than the first metal.

In a second aspect of the present invention, the present invention provides a sensor for detecting glucose comprising the electrode described in the first aspect of the present invention.

In a third aspect of the present invention, the present invention provides a method for preparing an electrode comprising the steps of forming a substrate by coating graphene layer on the first metal (step 1); and immersing the substrate in a second metal precursor solution to deposit a complex comprising the second metal and the hydroxide of the first metal on the substrate (step 2), wherein the complex is in the form of core-shell in which the second metal is a core and the hydroxide of the first metal is a shell, and the second metal has a higher standard reduction potential than the first metal.

The graphene-coated metal foam of the present invention can play as an electron pump because of the electric double layer interface or interfacial dipole induced by the graphene coated on the metal surface, suggesting that it has an excellent catalytic effect that can fast reduce metals (Au, Pt, Ag, and Cu, etc.) having a higher reduction potential than the metal simply by electroless deposition without requiring any additional reducing agent or electrical reduction conditions. Such an electric double layer or interfacial dipole has been theoretically studied before, and its existence has been proved experimentally for the first time through the present invention. Since the Ag@Ni(OH)$_2$ formed on the graphene-coated Ni foam (GNF) based substrate according to the present invention promotes the electrode reaction due to its unique structure, it can be used as an electrochemical sensor, in particular, a low detection limit of 0.3 μM and a high sensitivity for glucose detection can be achieved. Also, the Ag@Ni(OH)$_2$-GNF complex formed can be effectively applied to a variety of fields.

BRIEF DESCRIPTION OF THE DRAWINGS

The application of the preferred embodiments of the present invention is best understood with reference to the accompanying drawings, wherein:

FIG. 2a-1 is a high resolution image of FIG. 2a;

FIG. 2b-1 is a high resolution image of FIG. 2b;

FIG. 2c-1 is a high resolution image of FIG. 2c;

FIG. 2d-1 is a high resolution image of FIG. 2d;

FIG. 2e-1 is a high resolution image of FIG. 2e;

FIG. 2f-1 is a high resolution image of FIG. 2f;

FIG. 2g-1 is a high resolution image of FIG. 2g;

FIG. 2h-1 is a high resolution image of FIG. 2h;

FIG. 6b is a graph showing the results of EDS assay of the red box of FIG. 6a;

FIG. 15b present, according to an example of the present invention, SAED pattern corresponding to circle area of FIG. 15a;

DETAILED DESCRIPTION

Figure 1A:
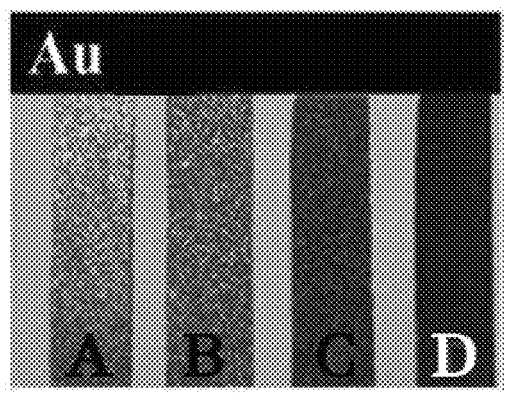
FIG. 1a is a photograph showing the optical image of NF and GNF before and after deposition for 1 hour in 0.9 mM HAuCl4 solution according to an example of the present invention (A and B represent NF before and after deposition, respectively, and C and D represent GNF before and after deposition, respectively)
Figure 1B:
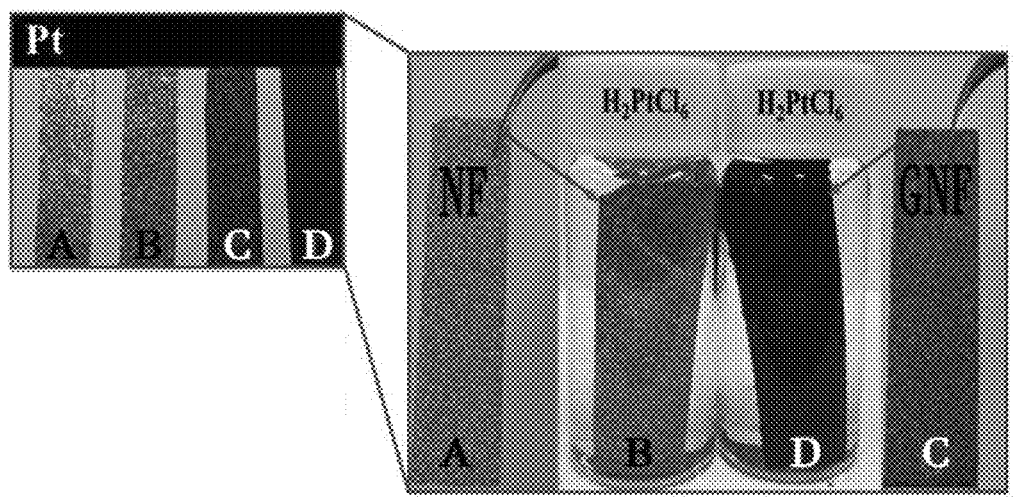
FIG. 1b is a photograph showing the optical image of NF and GNF before and after deposition for 1 hour in 0.9 mM H2PtCl6 solution according to an example of the present invention (A and B represent NF before and after deposition, respectively, and C and D represent GNF before and after deposition, respectively)
Figure 1C:
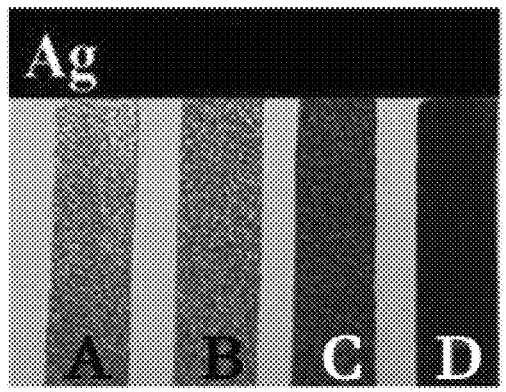
FIG. 1c is a photograph showing the optical image of NF and GNF before and after deposition for 1 hour in 0.9 mM AgNO3 solution according to an example of the present invention (A and B represent NF before and after deposition, respectively, and C and D represent GNF before and after deposition, respectively)
Figure 1D:
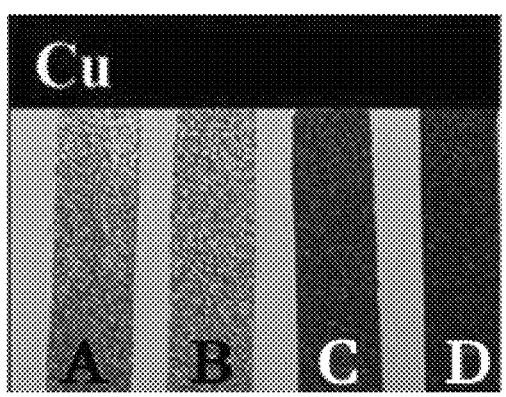
FIG. 1d is a photograph showing the optical image of NF and GNF before and after deposition for 1 hour in 0.9 mM CuSO4 solution according to an example of the present invention (A and B represent NF before and after deposition, respectively, and C and D represent GNF before and after deposition, respectively)

Hereinafter, examples the present invention will be described in detail with reference to the accompanying figures so that those skilled in the art can easily perform the art. However, the present invention can be accomplished by different manners and the present invention is not limited to these examples set forth herein. In order to clearly describe the present invention, the portions not related to the description have been omitted in the figures, and the similar parts are labeled with the similar marks throughout the specification.

Throughout the entire specification, when a part is referred to as being "connected" to another part, that means the part is not only "directly connected" but also "electrically connected" having another element in between.

Throughout the entire specification, when a material is located "on" another material, this includes not only the case where the material is attached to the other material but also the case where another material exists between the two materials.

Throughout the entire specification, when a part "contains" a component, it is understood that it may include other components, not excluding other components unless specifically stated otherwise. The terms "approximately" and "substantially" used through the entire specification mean that the numerical value is close to the proposed one by the unique manufacturing and material tolerance, which are used to help people understand the present invention and to prevent the principle number mentioned in the invention from being mis-used. The term "step to" or "step of" used throughout the entire specification does not mean "step for".

Throughout the entire specification, the term "combination thereof" included in the Markush type expression indicates one or more mixtures or combinations selected from the group consisting of the components described in the Markush type expression, which is it is the complex composed of one or more elements selected from the group above.

In a first aspect of the present invention, the present invention provides an electrode composed of a substrate including a graphene layer coated on a first metal; and a complex comprising a second metal deposited on the substrate and a hydroxide of the first metal, wherein the complex is in the form of core-shell in which the second metal is a core and the hydroxide of the first metal is a shell, and the second metal has a higher standard reduction potential than the first metal.

Hereinafter, the electrode according to the first aspect of the present invention is described in more detail.

In a preferred embodiment of the present invention, the first metal can include a metal selected from the group consisting of nickel (Ni), copper (Cu), cobalt (Co), iron (Fe), and combinations thereof, but not always limited thereto.

In a preferred embodiment of the present invention, the first metal can be in the form of a foam or a plate, but not always limited thereto.

In a preferred embodiment of the present invention, the second metal is not limited as long as the metal has a higher standard reduction potential than the first metal, which can be, for example, a transition metal of group 10 or group 11 of the periodic table, but not always limited thereto. Preferably, the second metal can include a metal selected from the group consisting of gold (Au), platinum (Pt), silver (Ag), copper (Cu), and combinations thereof, but not always limited thereto.

In a preferred embodiment of the present invention, the substrate can have an electric double layer or interfacial dipole structure composed of a first metal and a graphene layer. That is, as shown in FIG. 21, the first metal is coated with the graphene layer so that electrons move from nickel to graphene, resulting in the formation of the electric double layer or interfacial dipole. This structure can be confirmed by the distribution of electron density based on DFT (Density Functional Theory). This structure can activate the transport of electrons of the first metal for reduction of the second metal ions, described below. Thus, the substrate can comprise a graphene layer to significantly accelerate the reduction of the second metal ions.

In a preferred embodiment of the present invention, the content of the graphene layer can be approximately 0.1 weight part ~0.5 weight part by 100 weight part of the first metal, but not always limited thereto. If the content of the graphene layer above is less than 0.1 weight part, the graphene layer is not expected to be completely formed to cause a problem, while if the content of the graphene layer is more than 0.5 weight part, that is, the thickness of the graphene layer is too thick, the strength of sensing would be decreased, but not always limited thereto.

In a preferred embodiment of the present invention, the complex has core-shell structure in which the second metal is a core and the hydroxide of the first metal is a shell, That is, the first metal is oxidized, and the electrons generated by the oxidation of the first metal reduce the second metal ions to form the second metal. At the same time, the first metal is oxidized to form a hydroxide of the first metal, which surrounds the second metal. So, the complex has a core shell structure in which the second metal is a core and the hydroxide of the first metal is a shell.

In a preferred embodiment of the present invention, the content of the hydroxide of the first metal can be approximately 20 weight part ~50 weight part by 100 weight part of the second metal, but not always limited thereto. If the content of the hydroxide of the first metal is less than 20 weight part, the hydroxide shell cannot be fully grown, while if the content of the hydroxide of the first metal is more than 50 weight part, the speed of electron mobility to the second metal would not be appropriate, but not always limited thereto.

In a preferred embodiment of the present invention, the content of the complex above can be approximately 2 weight part ~10 weight part by 100 weight part of the substrate, but not always limited thereto. If the content of the complex above is less than 2 weight part, the complex cannot be formed properly, while if the content of the complex above is more than 10 weight part, that is, the complex becomes excessively thicker, the electrode reaction might be troubled, but not always limited thereto.

In a preferred embodiment of the present invention, the hydroxide of the first metal can be the form of a porous nanosheet. So, when it is applied to a sensor for detecting glucose, which will be described in the second aspect of the present invention below, it can provide a sufficient reaction interface between the first metal hydroxide and electrolyte so that the electron transport from the hydroxide of the first metal to the substrate can be accomplished and the high current response and high sensitivity can be achieved.

In a preferred embodiment of the present invention, the complex above can have a flower like structure. The hydroxide of the first metal can be in the form of a porous nanosheet, so that the hydroxide of the first metal forms a shell on the second metal core, so that the composite has a flower-like structure. The hydroxide of the first metal can be in the form of a porous nanosheet, so that the hydroxide of the first metal can form a shell covering the second metal core, resulting in the flower like structure for the complex.

In a preferred embodiment of the present invention, the electrode above does not contain a binder so that the contact resistance can be reduced significantly. At the same time, the surface area is significantly increased because the active material (the complex above) has a hierarchical structure. In addition, the electron path is shortened to generate more active sites in the electrode.

In a second aspect of the present invention, the present invention provides a sensor for detecting glucose comprising the electrode described in the first aspect of the present invention.

Although the determined description of the parts overlapping with the first aspect of the present invention is omitted, the description of the first aspect of the present invention may be applied equally to the second aspect.

Hereinafter, the sensor for detecting glucose according to the second aspect of the present invention is described in more detail.

In a preferred embodiment of the present invention, the hydroxide of the first metal can be an active material for a non enzymatic glucose sensor as shown in reaction formula 1 and reaction formula 2 below:

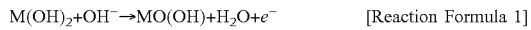  [Reaction Formula 1]

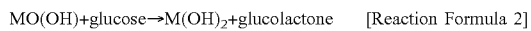  [Reaction Formula 2]

(In the above reaction formulas 1 and 2, M is the first metal).

In a preferred embodiment of the present invention, the electrode comprises a substrate composed of a first metal in the form of a foam or a plate coated with a graphene layer; and a complex composed of a second metal deposited on the substrate and a hydroxide of the first metal above. The complex herein has a core-shell structure, in which the second metal is core and the hydroxide of the first metal is a shell.

In a preferred embodiment of the present invention, the first metal can include a metal selected from the group consisting of nickel (Ni), copper (Cu), cobalt (Co), iron (Fe), and combinations thereof, but not always limited thereto.

In a preferred embodiment of the present invention, the second metal is not limited as long as the metal has a higher standard reduction potential than the first metal, which can be, for example, a transition metal of group 10 or group 11 of the periodic table, but not always limited thereto. Preferably, the second metal can include a metal selected from the group consisting of gold (Au), platinum (Pt), silver (Ag), copper (Cu), and combinations thereof, but not always limited thereto.

In a preferred embodiment of the present invention, the substrate can have an electric double layer or interfacial dipole structure composed of a first metal and a graphene layer. That is, as shown in FIG. 21, the first metal is coated with the graphene layer so that electrons move from nickel to graphene, resulting in the formation of the electric double layer or interfacial dipole. This structure can be confirmed by the distribution of electron density based on DFT (Density Functional Theory). This structure can activate the transport of electrons of the first metal for reduction of the second metal ions, described below. Thus, the substrate can comprise a graphene layer to significantly accelerate the reduction of the second metal ions. Herein, the electric double layer or interfacial dipole serves as an electron pump to provide electrons through graphene, which can rapidly reduce metal ions.

In a preferred embodiment of the present invention, the content of the graphene layer can be approximately 0.1 weight part ~0.5 weight part by 100 weight part of the first metal, but not always limited thereto. If the content of the graphene layer above is less than 0.1 weight part, the graphene layer is not expected to be completely formed to cause a problem, while if the content of the graphene layer is more than 0.5 weight part, that is, the thickness of the graphene layer is too thick, the strength of sensing would be decreased, but not always limited thereto.

In a preferred embodiment of the present invention, the complex has a core-shell structure in which the second metal is a core and the hydroxide of the first metal is a shell. That is, the first metal is oxidized and the electrons generated by the oxidation of the first metal reduce the second metal ions to form the second metal. At the same time, the first metal is oxidized to form a hydroxide of the first metal, which surrounds the second metal. So, the complex has a core-shell structure in which the second metal is a core and the hydroxide of the first metal is a shell.

In a preferred embodiment of the present invention, the content of the hydroxide of the first metal can be approximately 20 weight part ~50 weight part by 100 weight part of the second metal, but not always limited thereto. If the content of the hydroxide of the first metal is less than 20 weight part, the hydroxide shell cannot be fully grown, while if the content of the hydroxide of the first metal is more than 50 weight part, the speed of electron mobility to the second metal would not be appropriate, but not always limited thereto.

In a preferred embodiment of the present invention, the content of the complex above can be approximately 2 weight part ~10 weight part by 100 weight part of the substrate, but not always limited thereto. If the content of the complex above is less than 2 weight part, the complex cannot be formed properly, while if the content of the complex above is more than 10 weight part, that is the complex becomes excessively thicker, the electrode reaction might be troubled, but not always limited thereto.

In a preferred embodiment of the present invention, the hydroxide of the first metal can be the form of a porous nanosheet. So, when it is applied to a sensor for detecting glucose, which will be described in the second aspect of the present invention below, it can provide a sufficient reaction interface between the first metal hydroxide and electrolyte so that the electron transport from the hydroxide of the first metal to the substrate can be accomplished and the high current response and high sensitivity can be achieved.

In a preferred embodiment of the present invention, the complex above can have a flower like structure. The hydroxide of the first metal can be in the form of a porous nanosheet, so that the hydroxide of the first metal forms a shell on the second metal core, so that the composite has a flower-like structure. The hydroxide of the first metal can be in the form of a porous nanosheet, so that the hydroxide of the first metal can form a shell covering the second metal core, resulting in the flower like structure for the complex.

In a third aspect of the present invention, the present invention provides a method for preparing an electrode comprising the steps of forming a substrate by coating a graphene layer on the first metal (step 1); and immersing the substrate in a second metal precursor solution to deposit a complex comprising the second metal and the hydroxide of the first metal on the substrate (step 2), wherein the complex is in the form of core-shell in which the second metal is a core and the hydroxide of the first metal is a shell, and the second metal has a higher standard reduction potential than the first metal.

Although the detailed description of the parts overlapping with the first aspect and the second aspect of the present invention is omitted, the description of the first aspect and the second aspect of the present invention may be applied equally to the third aspect.

Hereinafter, the method for preparing an electrode according to the third aspect of the present invention is described in more detail step by step.

In one embodiment of the present invention, the method for preparing an electrode includes a step (step 1) of forming a substrate by coating a graphene layer on the first metal (step 1).

In a preferred embodiment of the present invention, the coating of the graphene layer in step 1 can be performed by chemical vapor deposition (CVD) or liquid coating, but not always limited thereto.

In a preferred embodiment of the present invention, the first metal can include a metal selected from the group consisting of nickel (Ni), copper (Cu), cobalt (Co), iron (Fe), and combinations thereof, but not always limited thereto.

In a preferred embodiment of the present invention, the first metal can be in the form of a foam or a plate, but not always limited thereto.

In a preferred embodiment of the present invention, the content of the graphene layer can be approximately 0.1 weight part ~0.5 weight part by 100 weight part of the first metal, but not always limited thereto. If the content of the graphene layer above is less than 0.1 weight part, the graphene layer is not expected to be completely formed to cause a problem, while if the content of the graphene layer is more than 0.5 weight part, that is, the thickness of the graphene layer is too thick, the strength of sensing would be decreased, but not always limited thereto.

Next, in a preferred embodiment of the present invention, the method for preparing an electrode includes step of immersing the substrate in a second metal precursor solution to deposit a complex comprising the second metal and the hydroxide of the first metal on the substrate (step 2).

In a preferred embodiment of the present invention, the deposition in step 2 above can be performed for 1 to 6 hours.

In a preferred embodiment of the present invention, the second metal precursor solution can contain metal ions, whose metal has a higher standard reduction potential than the first metal. For example, a transition metal of group 10 or group of the periodic table can be included, but not always limited hereto. Preferably, the second metal precursor solution can include a solution selected from the group consisting of $HAuCl_4$, $H_2PtCl_6$, $AgNO_3$, $CuSO_4$ and combinations thereof, but not always limited thereto.

In a preferred embodiment of the present invention, the substrate can have an electric double layer or interfacial dipole structure composed of a first metal and a graphene layer. That is, the graphene layer is coated on the first metal to activate the transport of electrons of the first metal for the reduction of the second metal ions, which will be described below. So, the substrate above can accelerate the reduction of the second metal ions significantly by comprising the graphene layer.

In a preferred embodiment of the present invention, the complex has a core-shell structure in which the second metal is a core and the hydroxide of the first metal is a shell. That is, the first metal is oxidized, and the electrons generated by the oxidation of the first metal reduce the second metal ions to form the second metal. At the same time, the first metal is oxidized to form a hydroxide of the first metal, which surrounds the second metal. So, the complex has core-shell structure in which the second metal is a core and the hydroxide of the first metal is a shell.

In a preferred embodiment of the present invention, the content of the hydroxide of the first metal can be approximately 20 weight part ~50 weight part by 100 weight part of the second metal, but not always limited thereto. If the content of the hydroxide of the first metal is less than 20 weight part, the hydroxide shell cannot be fully grown, while if the content of the hydroxide of the first metal is more than 50 weight part, the speed of electron mobility to the second metal would not be appropriate, but not always limited thereto.

In a preferred embodiment of the present invention, the content of the complex above can be approximately 2 weight part ~10 weight part by 100 weight part of the substrate, but not always limited thereto. If the content of the complex above is less than 2 weight part, the complex cannot be formed properly, while if the content of the complex above is more than 10 weight part, that is the complex becomes excessively thicker, the electrode reaction might be troubled, but not always limited thereto.

In a preferred embodiment of the present invention, the hydroxide of the first metal can be the form of a porous nanosheet. So, when it is applied to a sensor for detecting glucose, which will be described in the second aspect of the present invention below, it can provide a sufficient reaction interface between the first metal hydroxide and electrolyte so that the electron transport from the hydroxide of the first metal to the substrate can be accomplished and the high current response and high sensitivity can be achieved.

In a preferred embodiment of the present invention, the complex above can have a flower like structure. The hydroxide of the first metal can be in the form of a porous nanosheet, so that the hydroxide of the first metal forms a shell on the second metal core, so that the complex has a flower-like structure.

In a preferred embodiment of the present invention, the electrode above does not contain a binder so that the contact resistance can be reduced significantly. At the same time, the surface area is significantly increased because the active material (the complex above) has a hierarchical structure. In addition, the electron path is shortened to generate more active sites in the electrode.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Materials

Chloroplatinic acid ($H_2PtCl_6·6H_2O$), chloroauric acid ($HAuCl_4·3H_2O$, 99.9%), silver nitrate ($AgNO_3$, 99.5%), copper sulfate ($CuSO_4$, 97%), sodium hydroxide, glucose, ascorbic acid (AA), fructose, dopamine, and uric acid (UA) were provided by Sigma Aldrich Co. The compounds above were used without any purification. Nickel foam (area dens 320±20 g m$^2$ and thickness: 1.5 mm) was purchased from Taiyuan Lizhiyuan Battery Material Co., China.

EXAMPLE 2

Electroless Deposition of Metal on NF and GNF

GNF was synthesized by CVD according to the conventional method. The pre-synthesized GNF was cut into a 5 mm×20 mm square and washed several times with ethanol before use. Deposition of metals (At, Pt, Ag and Cu) on GNF and NF was performed as follows. 0.9 mM $HAuCl_4$, $H_2PtCl_6$, $AgNO_3$, and $CuSO_4$ precursors were prepared, which were loaded in glass bottles respectively and stored in a dark room. The GNF section was immersed in the solution. One hour later, the sample was washed several times with ethanol and deionized water, followed by drying at 60° C. As a comparative example, the deposition of metal on NF was performed by the same manner under the same conditions. Precursors of 0.125 mM $HAuCl_4$, 0.25 mM $H_2PtCl_6$, 0.45 mM $AgNO_3$, and 0.60 mM $CuSO_4$ were prepared to study the deposition mechanism. For the preparation of the sensor electrode, 80 mol of 0.45 mM $AgNO_3$ was used to obtain a thin layer of Ag@Ni(OH)$_2$ on GNF.

EXAMPLE 3

Method of Analyzing Material Characteristics

The morphology was investigated by scanning electron microscopy (SEM; Hitachi S-4700) at an accelerating voltage of 10 kV and transmission electron microscopy (TEM; EM 912 Omega, Zeiss) at 120 kV. The XRD pattern of a material was obtained by using Rigaku Smartlab diffractometer equipped with Cu Kα radiation and Ni filters. The X-ray source was operated at 40 kV and 30 mA. HR-SEM images and selective region electron diffraction were obtained by using S-5500 ultrahigh-resolution scanning electron microscope operating at 30 kV. Ultraviolet photoelectron spectroscopy (UPS) of GF, NF and GNF was characterized by micro-X-ray UV photoelectron spectroscopy and photon source (XPS: monochromatic Al Kα, 1486.6 eV; and UPS: He, 21.2 eV). Work function was calculated by formula 1 below.

$$W = hv - \Phi \qquad \text{<Formula 1>}$$

In formula 1 above, W indicates the work function, by indicates the energy of photon source, and Φ indicates the energy width of UPS spectrum (Φ=Fermi edge–cut off edge, The Fermi edge and cutoff edge can be obtained by a tangential method).

EXAMPLE 4

Electrochemical Measurement Method

As a sensor for glucose detection, Ag@Ni(OH)$_2$-GNF was measured electrochemically in a 3-electrode cell. Glucose solutions were prepared at different concentrations and 0.1 M NaOH was used as electrolyte in all the experiments. The Ag@Ni(OH)$_2$-GNF hybrid was used as a working electrode (Only half of the 5 mm×10 mm section was used and the active material was scraped from the other part). Ag/AgCl electrode was used as a reference electrode and platinum wire was used as a counter electrode. CV was measured within the voltage range of –0.1 to 0.6 V (against Ag/AgCl) at different scan rates (2 to 10 mV/s) using an electrochemical analyzer (BioLogic VMP3). Amperometric response measurement was performed by adding glucose solution continuously.

EXAMPLE 4

Result Analysis

Figure 2A:
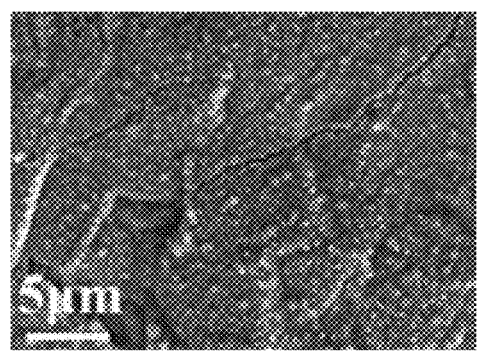
FIG. 2a is a SEM images showing the deposition of Au on GNF in 0.9 mM HAuCl4 solution for 1 hour according to an example of the present invention.
Figures 1, 2A:
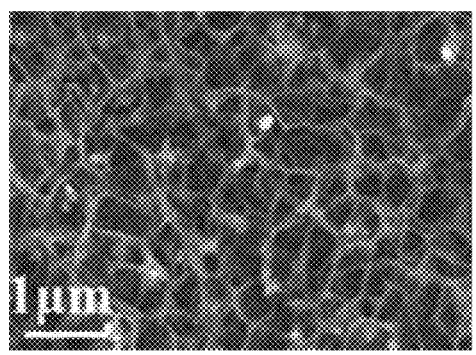
Figure 2B:
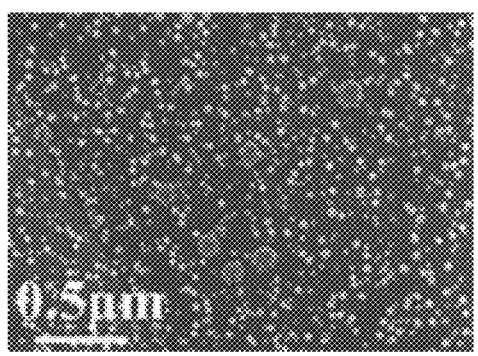
FIG. 2b is a SEM images showing the deposition of Au on NF in 0.9 mM HAuCl4 solution for 1 hour according to an example of the present invention.
Figures 1, 2B:
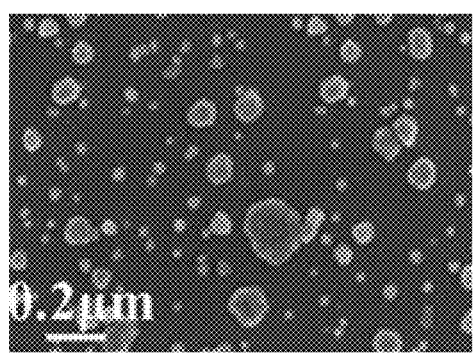
Figure 2C:
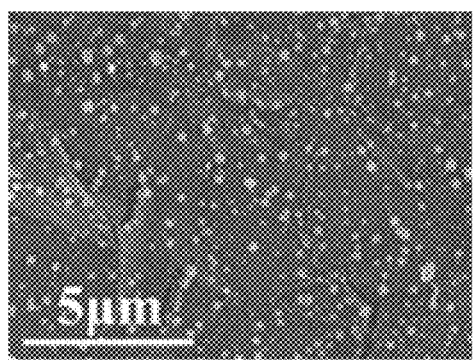
FIG. 2c is a SEM images showing the deposition of Pt on GNF in 0.9 mM H2PtCl6 solution for 1 hour according to an example of the present invention.
Figures 1, 2C:
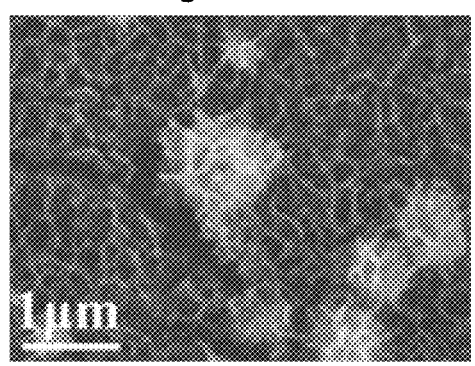
Figure 2D:
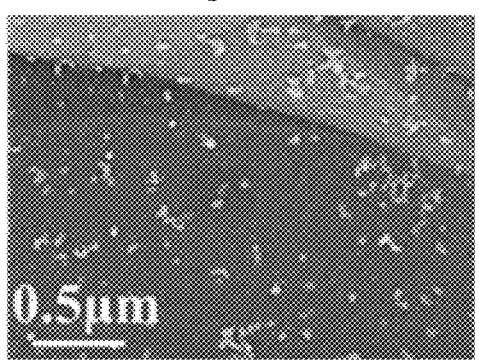
FIG. 2d is a SEM images showing the deposition of Pt on NF in 0.9 mM H2PtCl6 solution for 1 hour according to an example of the present invention.
Figures 1, 2D:
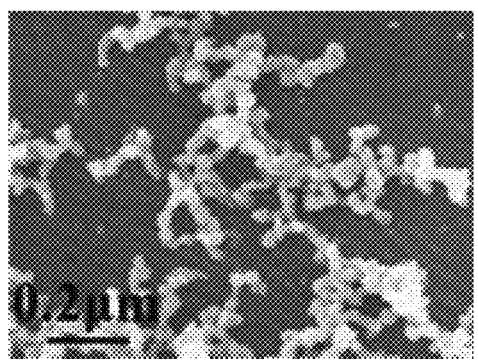
Figure 2E:
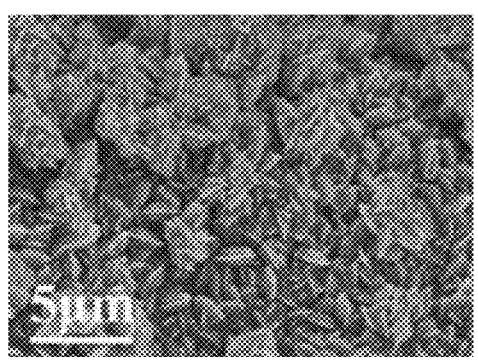
FIG. 2e is a SEM images showing the deposition of Ag on GNF in 0.9 mM AgNO3 solution for 1 hour according to an example of the present invention.
Figures 1, 2E:
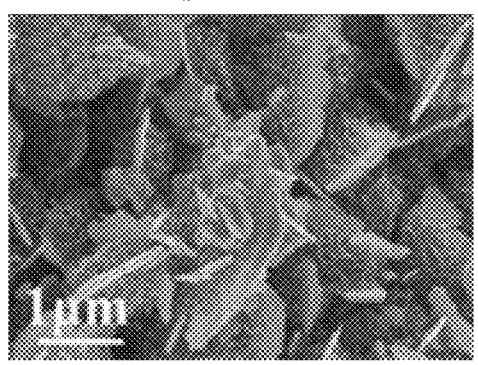
Figure 2F:
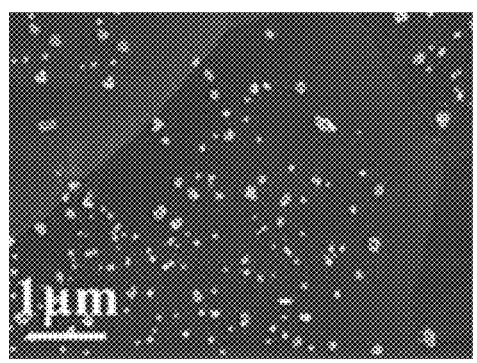
FIG. 2f is a SEM images showing the deposition of Ag on NF in 0.9 mM AgNO3 solution for 1 hour according to an example of the present invention.
Figures 1, 2F:
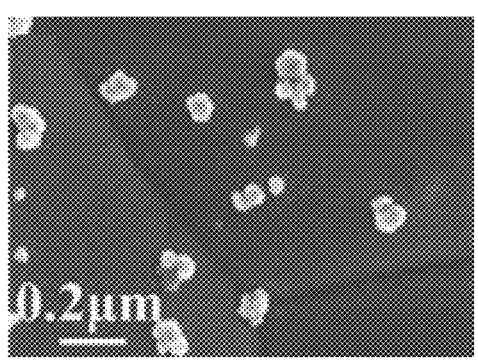
Figure 2G:
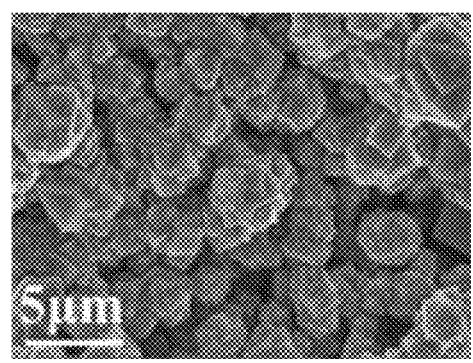
FIG. 2g is a SEM images showing the deposition of Cu on GNF in 0.9 mM CuSO4 solution for 1 hour according to an example of the present invention.
Figures 1, 2G:
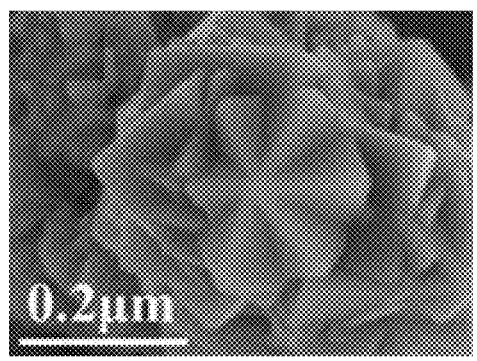
Figure 2H:
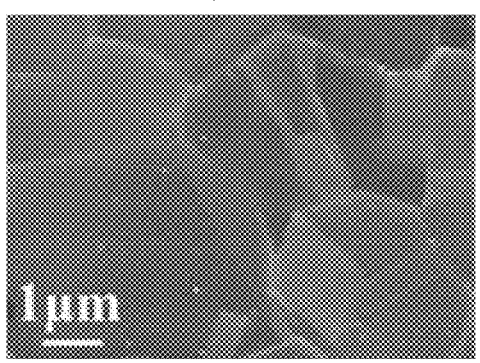
FIG. 2h is a SEM images showing the deposition of Cu on NF in 0.9 mM CuSO4 solution for 1 hour according to an example of the present invention.
Figures 1, 2H:
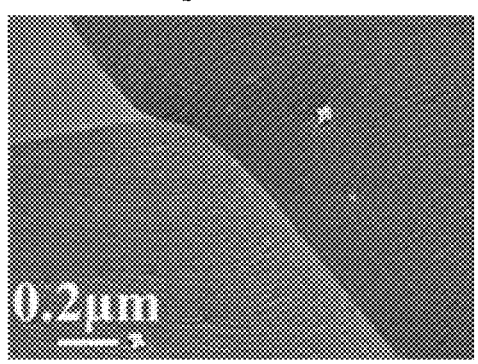

<4-1> Graphene/Nickel Interface-Induced Catalytic Effect on Metal Electroless Deposition It was confirmed that graphene attached to nickel displayed a significant catalytic effect on metal substitution reactions (Ni-M$^{x+}$, M: Au, Pt, Ag, and Cu). FIG. 1 presents optical photographs showing NF and GNF before and after deposition of Au, Pt, Ag and Cu thereon for 1 hour in 0.9 mM $HAuCl_4$, $H_2PtCl_6$, $AgNO_3$ and $CuSO_4$ solutions. M$^{x+}$ was reduced to metal nanoparticles on the surface of NF or GNF. In the case of the NF substrate, a significant color change was not observed. The surface color of NF became brighter from Au to Cu since the oxidizing property is gradually reduced from Au$^{3+}$, which has the highest oxidizing power, to Cu$^{2+}$ (sample B of FIG. 1a to FIG. 1d). The slight color change of NF showed a low deposition rate of Au, Pt, Ag and Cu. Interestingly, the GNF substrate displayed different reaction phenomena due to the intervention of graphene on the nickel surface. The metal ions were reduced fast by the lower nickel, during which the color was changed from gray to black (sample D of FIG. 1a to FIG. 1d). FIG. 2 shows the metal deposition on GNF and NF. Unexpectedly, a large amount of Ni(OH)$_2$ sheets were generated on GNF along with the deposition of Au, Pt and Ag (FIG. 2a(a1), FIG. 2c(c1), and FIG. 2e(e1)), but only a small amount of metal nanoparticles were observed on NF (FIG. 2b(b1), FIG. 2d(d1), FIG. 2f(f1), and FIG. 2h(g1)). However, Ni(OH)$_2$ sheets were not observed in GNF and NF according to Cu deposition (FIG. 2g(g1) and FIG. 2h(h1)).

Figure 3A:
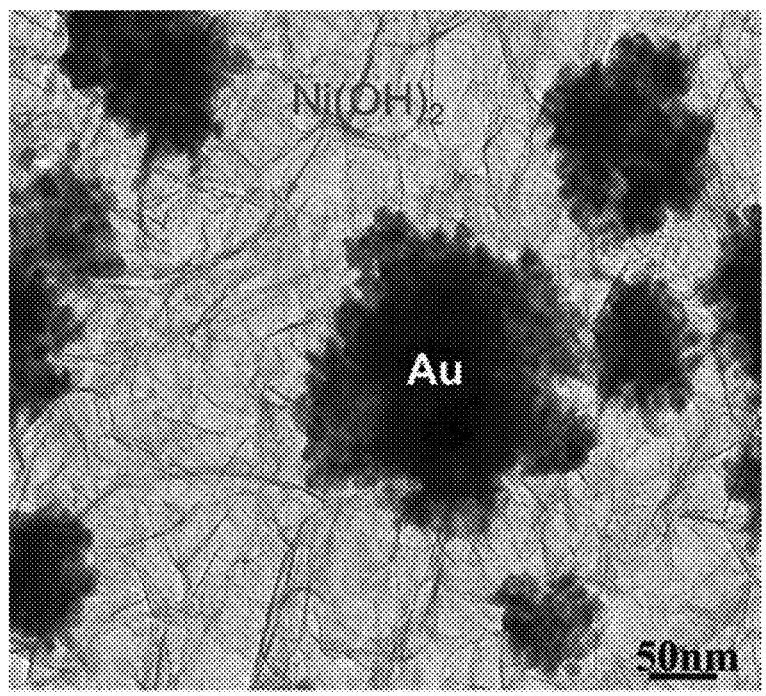
FIG. 3a is a TEM image showing the deposition of Au on GNF in 0.9 mM HAuCl4 solution for 1 hour according to an example of the present invention.
Figure 3B:
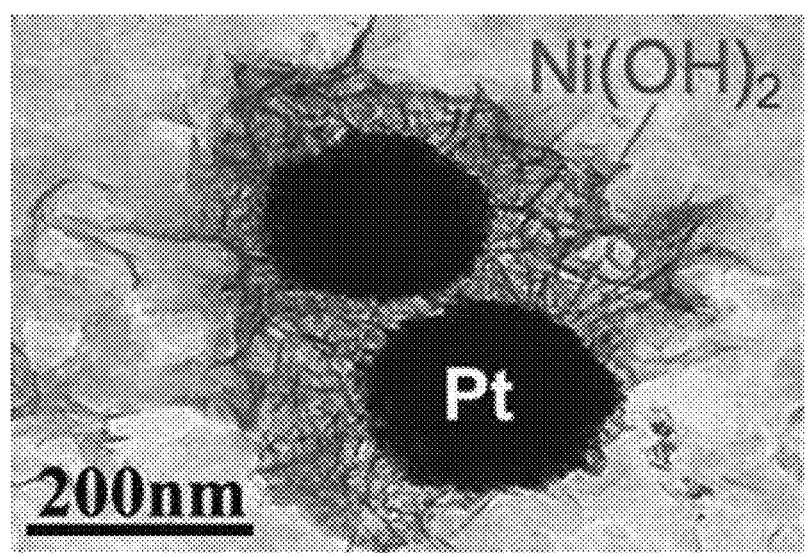
FIG. 3b is a TEM image showing the deposition of Pt on GNF in 0.9 mM H2PtCl6 solution for 1 hour according to an example of the present invention.
Figure 3C:
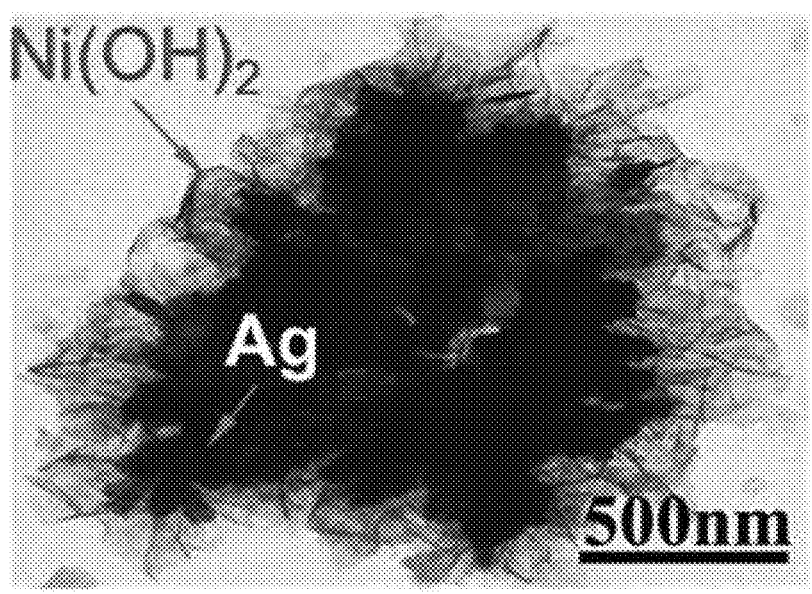
FIG. 3c is a TEM image showing the deposition of Ag on GNF in 0.9 mM AgNO3 solution for 1 hour according to an example of the present invention.
Figure 4A:
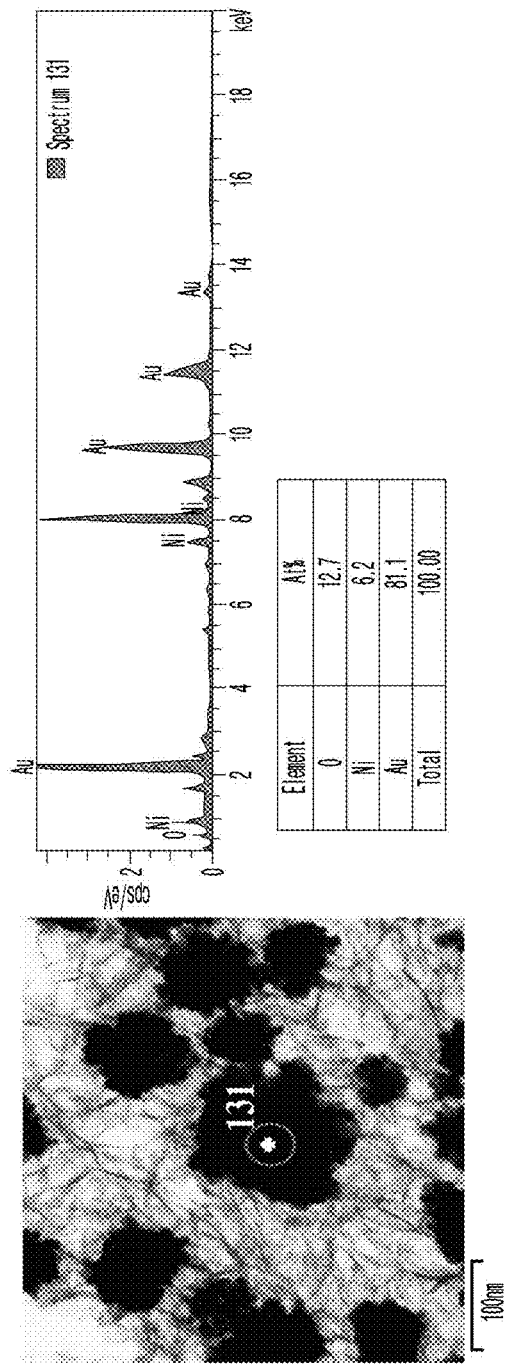
FIG. 4a is a TEM image of EDS assay with Au particle after the Au deposition on GNF in 0.9 mM HAuCl4 solution for 1 hour according to an example of the present invention.
Figure 4B:
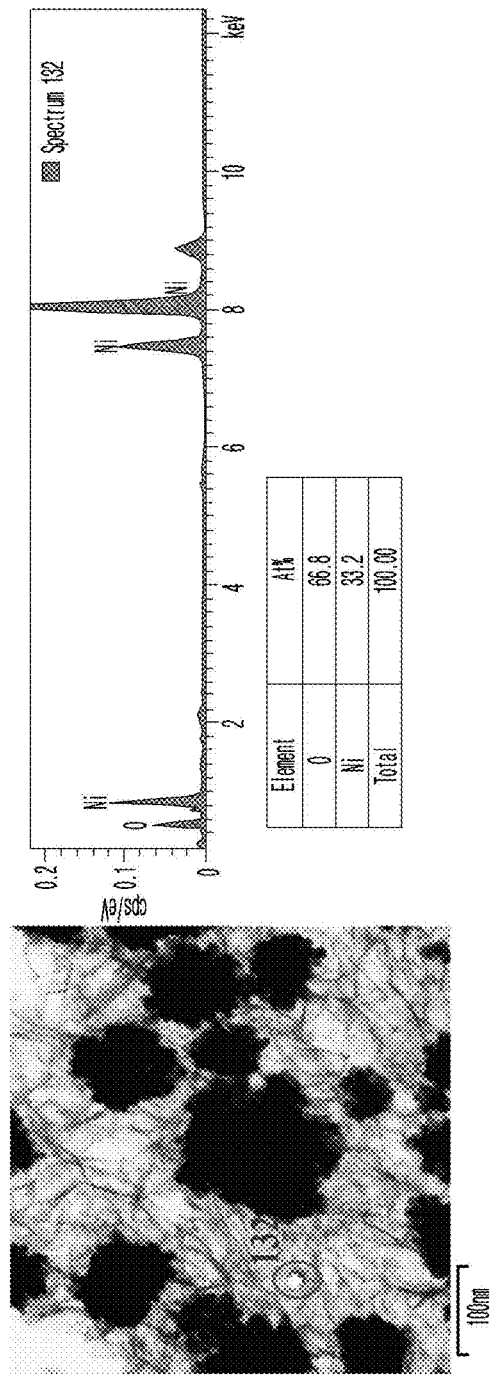
FIG. 4b is a TEM image of EDS assay with the Ni(OH)2 sheet after Au deposition on GNF in 0.9 mM HAuCl4 solution for 1 hour according to an example of the present invention.
Figure 5A:
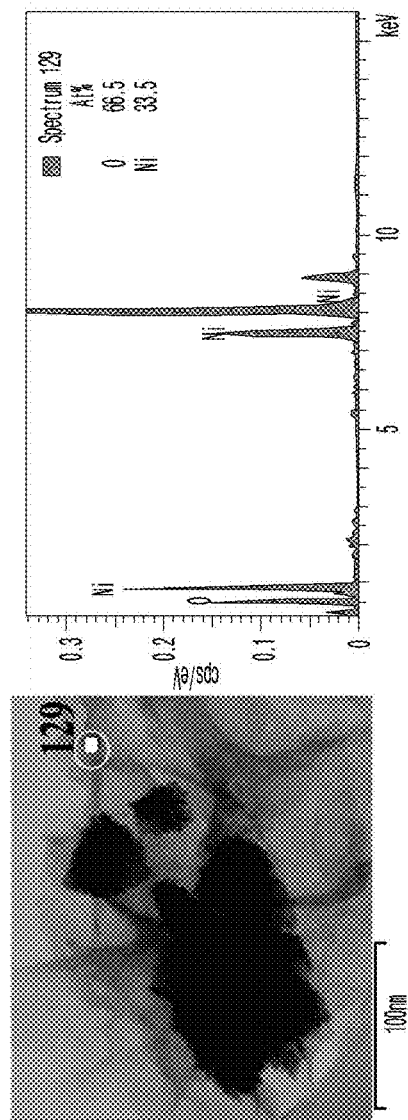
FIG. 5a is a TEM image of EDS assay with Ni(OH)2 sheet after the Pt deposition on GNF in 0.9 mM H2PtCl6 solution for 1 hour according to an example of the present invention.
Figure 5B:
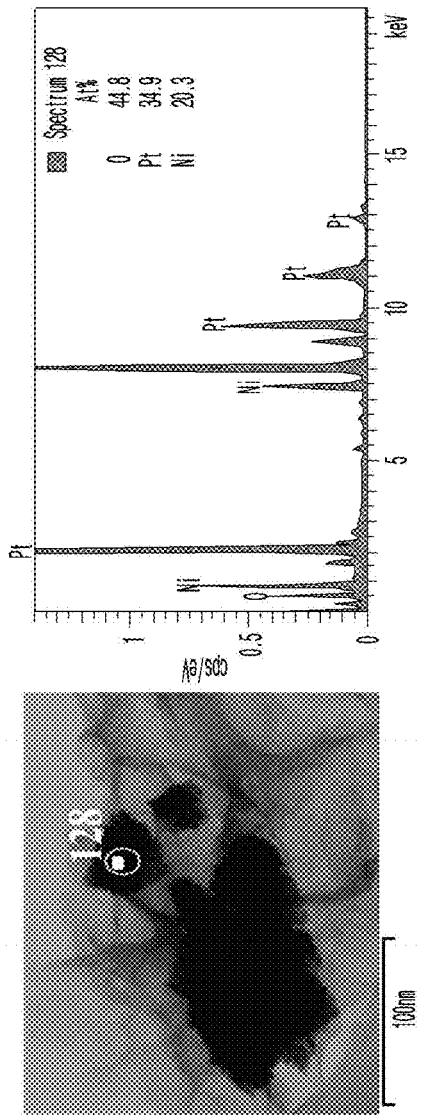
FIG. 5b is a TEM image of EDS assay with Pt nanoparticles after the Pt deposition on GNF in 0.9 mM H2PtCl6 solution for 1 hour according to an example of the present invention.
Figure 6A:
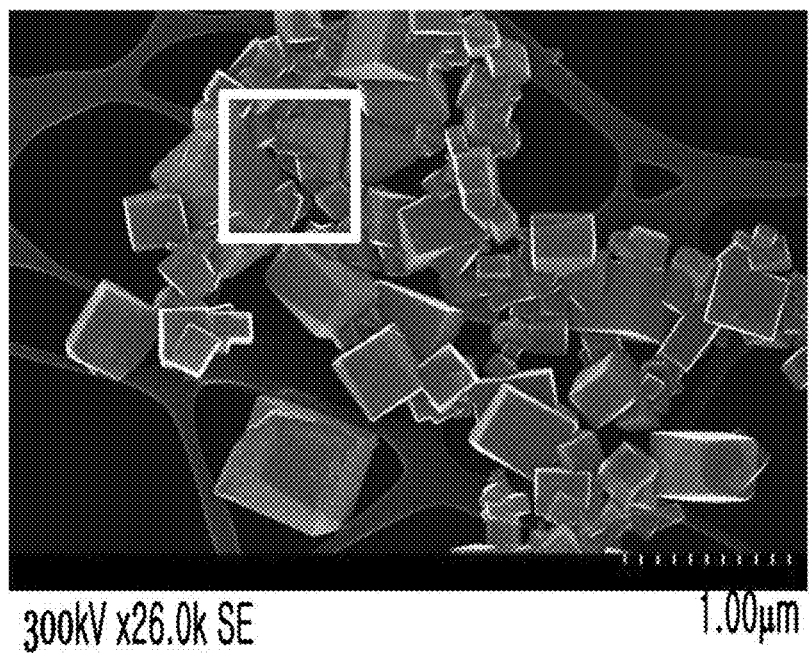
FIG. 6a is a SEM image showing the deposition of Cu on GNF in 0.9 mM CuSO4 according to an example of the present invention.
Figure 6B:
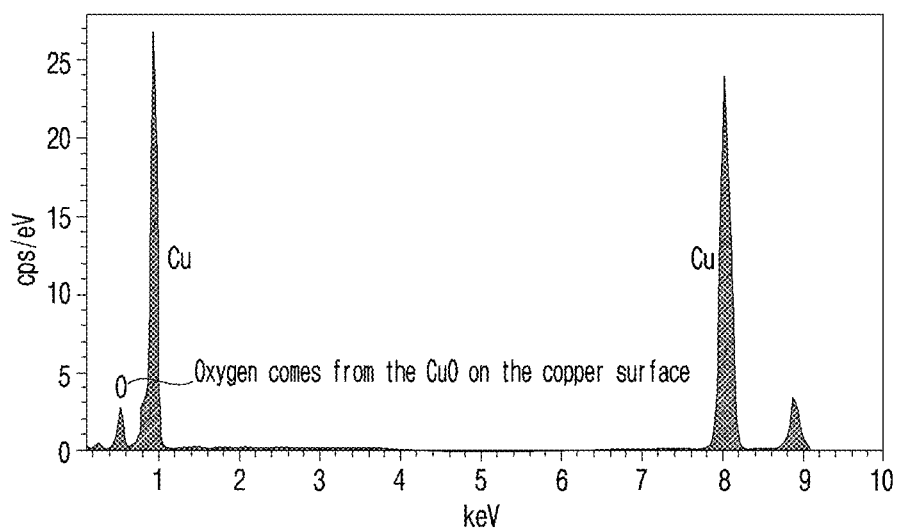

TEM images illustrate that Au, Pt and Ag were wrapped with $Ni(OH)_2$ sheet to produce a $MNPs@Ni(OH)_2$ hierarchical structure (FIG. 3), which was confirmed by EDS (FIGS. 4, 5, and 6).

Figure 7A:
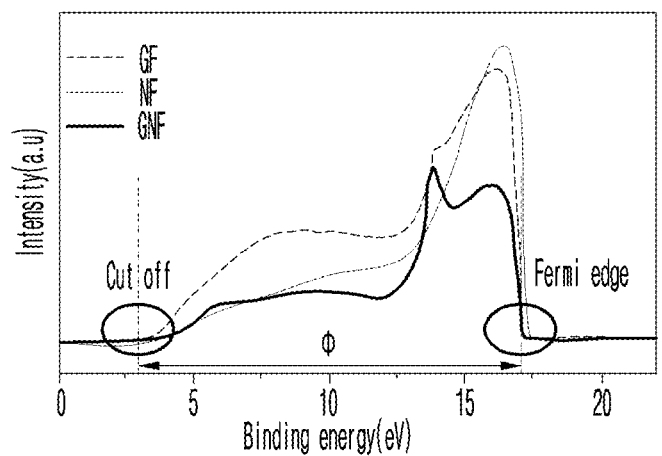
FIG. 7a present the results of ultraviolet photoelectron spectroscopy of GF (graphene foam), NF (Ni foam) and GNF according to an example of the present invention.
Figure 7B:
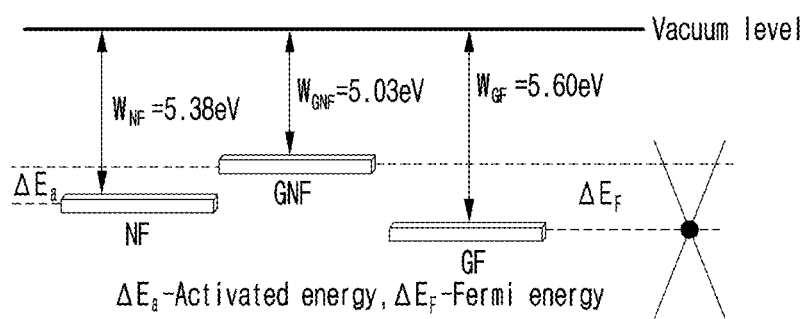
FIG. 7b present the work function of GF, NF and GNF calculated from FIG. 7a above.
Figure 7C:
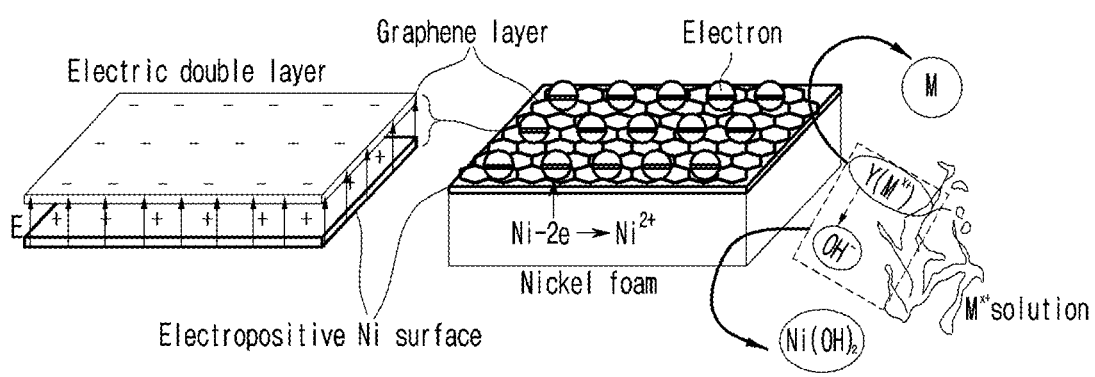
FIG. 7c present the mechanism of deposition-related graphene/nickel interface-induced catalytic effect of M (Au, Pt, Ag, and Cu) and Ni(OH)2 on GNF.
Figure 8A:
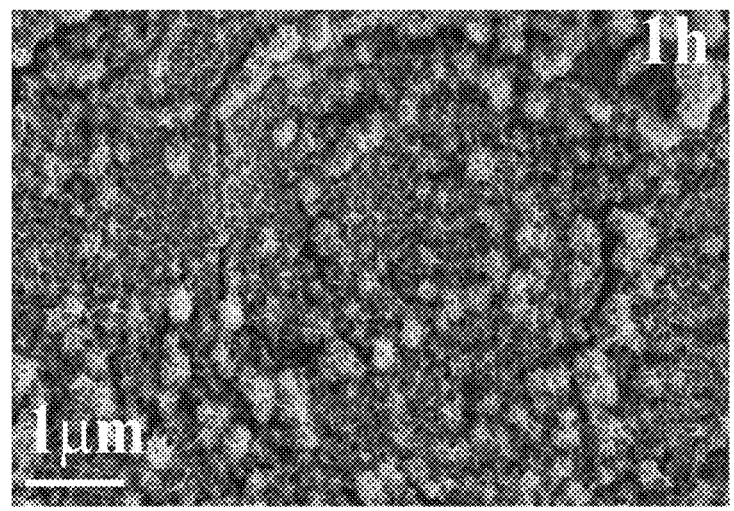
FIG. 8a is a SEM image of the sample deposited with Au on GNF in 0.125 mM HAuCl4 solution for 1 hour according to an example of the present invention.
Figure 8B:
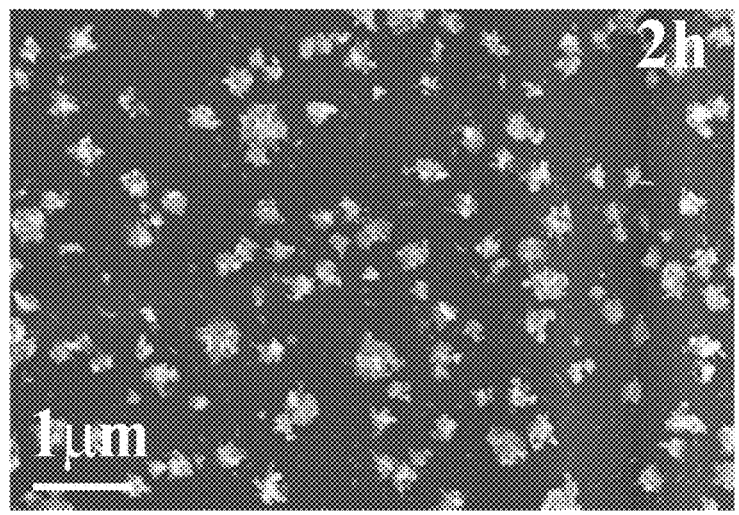
FIG. 8b is a SEM image of the sample deposited with Au on GNF in 0.125 mM HAuCl4 solution for 2 hour according to an example of the present invention.
Figure 8C:
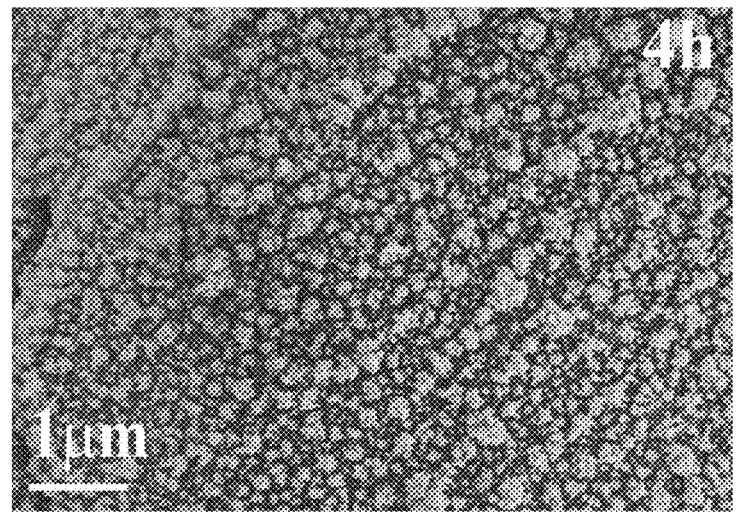
FIG. 8c is a SEM image of the sample deposited with Au on GNF in 0.125 mM HAuCl4 solution for 4 hour according to an example of the present invention.
Figure 8D:
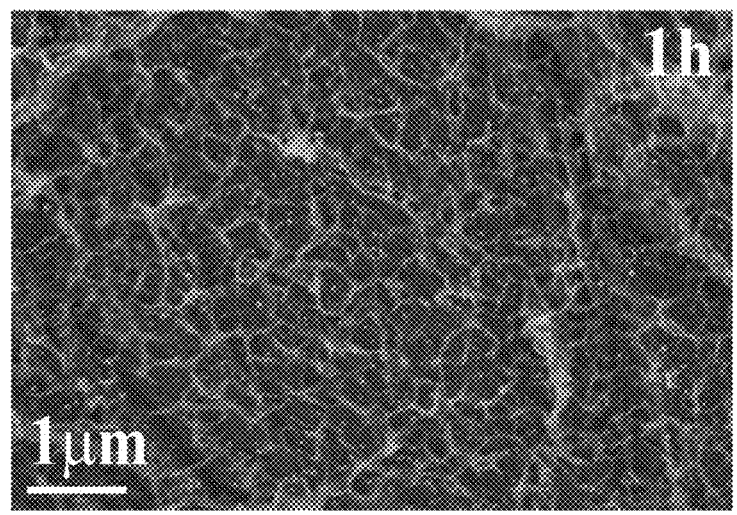
FIG. 8d is a SEM image of the sample deposited with Pt on GNF in 0.25 mM H2PtCl6 solution for 1 hour according to an example of the present invention.
Figure 8E:
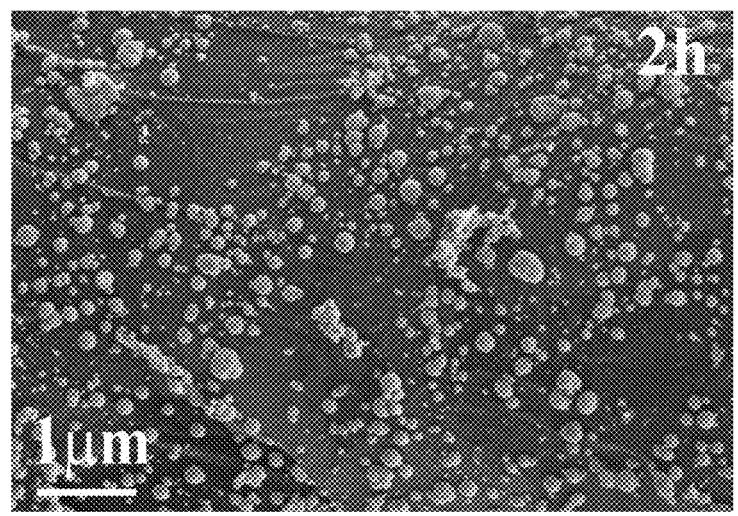
FIG. 8e is a SEM image of the sample deposited with Pt on GNF in 0.25 mM H2PtCl6 solution for 2 hour according to an example of the present invention.
Figure 8F:
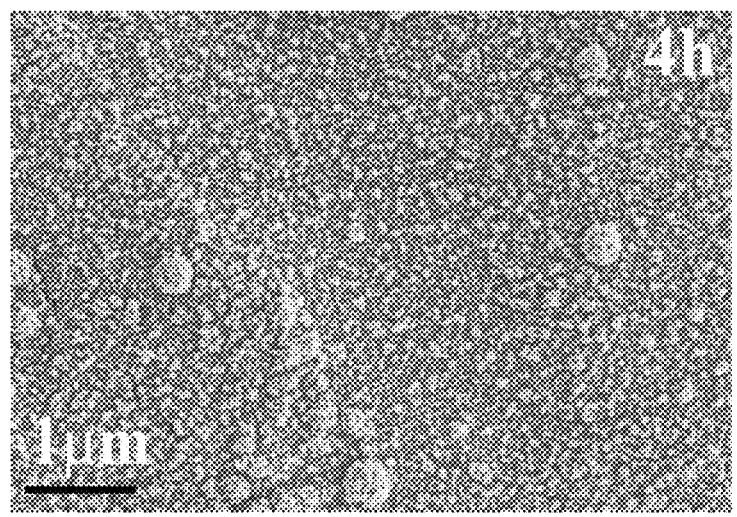
FIG. 8f is a SEM image of the sample deposited with Pt on GNF in 0.25 mM H2PtCl6 solution for 4 hour according to an example of the present invention.
Figure 8G:
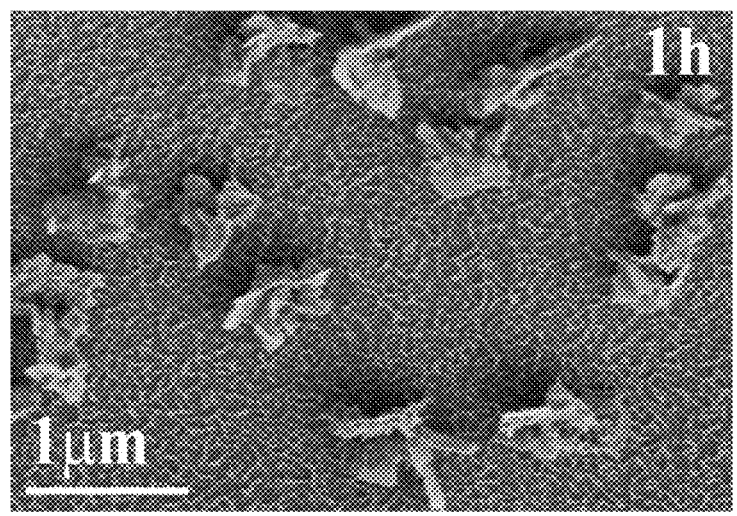
FIG. 8g is a SEM image of the sample deposited with Ag on GNF in 0.45 mM AgNO3 solution for 1 hour according to an example of the present invention.
Figure 8H:
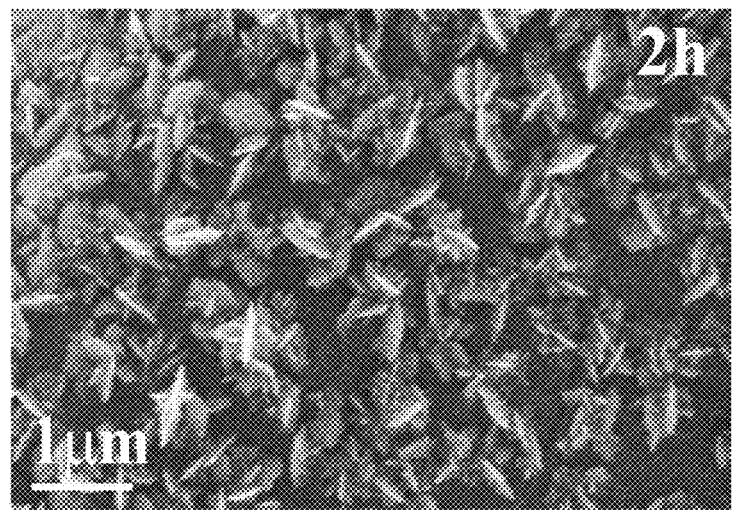
FIG. 8h is a SEM image of the sample deposited with Ag on GNF in 0.45 mM AgNO3 solution for 2 hour according to an example of the present invention.
Figure 8I:
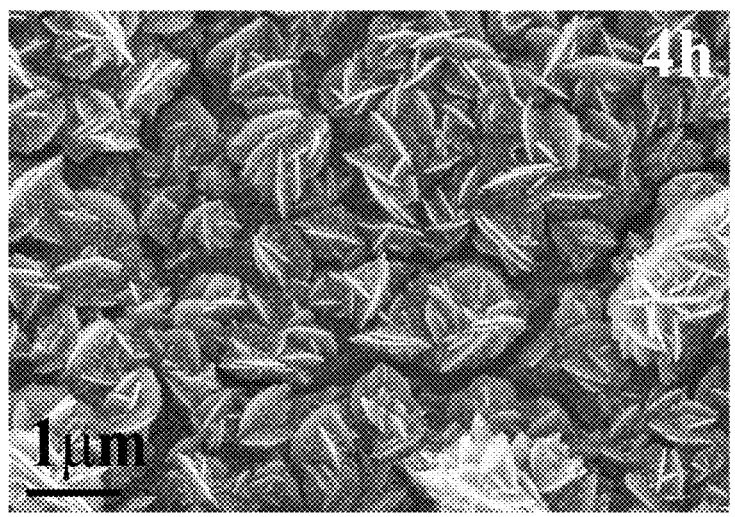
FIG. 8i is a SEM image of the sample deposited with Ag on GNF in 0.45 mM AgNO3 solution for 4 hour according to an example of the present invention.
Figure 8J:
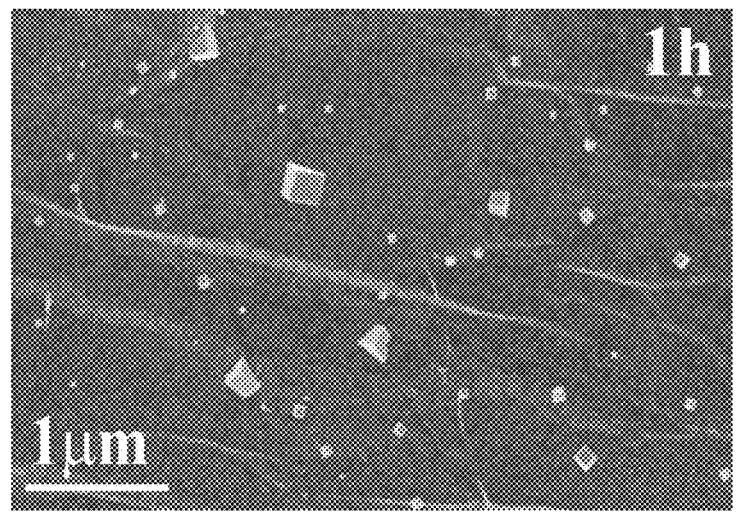
FIG. 8j is a SEM image of the sample deposited with Cu on GNF in 0.60 mM CuSO4 solution for 1 hour according to an example of the present invention.
Figure 8K:
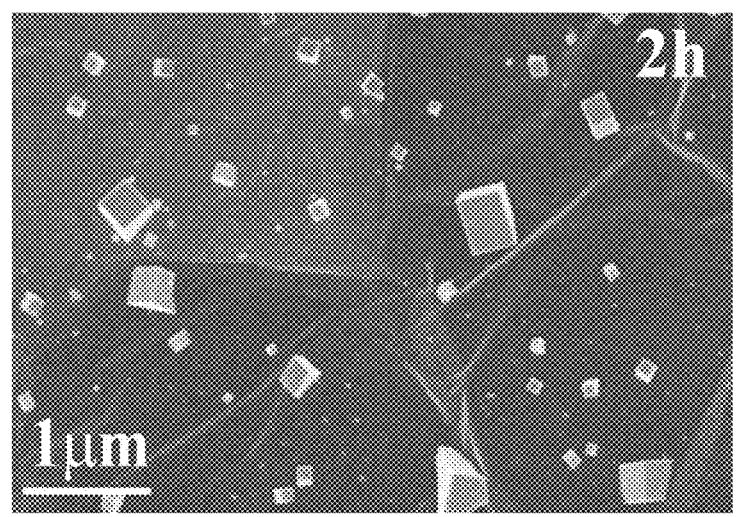
FIG. 8k is a SEM image of the sample deposited with Cu on GNF in 0.60 mM CuSO4 solution for 2 hour according to an example of the present invention.
Figure 8L:
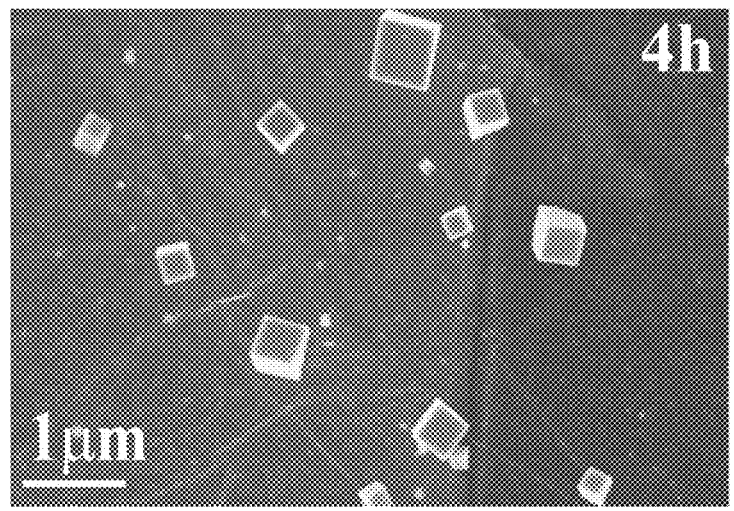
FIG. 8l is a SEM image of the sample deposited with Cu on GNF in 0.60 mM CuSO4 solution for 4 hour according to an example of the present invention.

It was previously reported that graphene, a zero-gap semiconductor, displays a strong electron interactions with a metal when it is chemically adsorbed on the surface of a metal. The interaction between the graphene and the metal substrate has been studied theoretically. Experimentally, the interaction caused changes in the graphene work function so that the Fermi level of graphene was moving up and down near the Dirac point according to whether the interaction on the surface was strong or weak. In the experiment above, graphene was attached strongly on the surface of nickel so that they had very close electron interactions at the interface. FIG. 7a presents the UPS plot of GF (graphene foam), NF and GNF, and FIG. 7b presents the work function of GF, NF and GNF. The work function of GNF was lower than that of NF of the comparative example which was 0.35 eV, and the Fermi level was moved back at the Dirac point of graphene, resulting in $E_F$, the Fermi energy difference indicating the movement of electrons from nickel to graphene. As a result, $E_a$ was generated as shown in FIG. 7b and FIG. 7c. So, free electrons can easily move from the nickel foam of comparative example to the graphene layer due to $E_a$. In fact, due to the electron transport from Ni to graphene, an electric double layer (EDL) or interfacial dipole was formed at the interface of the positively charged nickel and the negatively charged graphene surface. The EL reached equilibrium when the electrostatic field strength was high enough to prevent the electrons constantly moving away from the surface of nickel (FIG. 4c, left). So, it is reasonable to assume that hydrolysis and metal deposition with different precursors can be represented as follows:

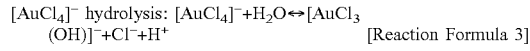

$[AuCl_4]^-$ hydrolysis: $[AuCl_4]^- + H_2O \leftrightarrow [AuCl_3(OH)]^- + Cl^- + H^+$     [Reaction Formula 3]

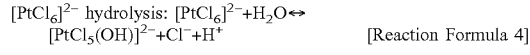

$[PtCl_6]^{2-}$ hydrolysis: $[PtCl_6]^{2-} + H_2O \leftrightarrow [PtCl_5(OH)]^{2-} + Cl^- + H^+$     [Reaction Formula 4]

$Ag^+$ hydrolysis: $Ag^+ + H_2O \leftrightarrow AgOH + H^+$     [Reaction Formula 5]

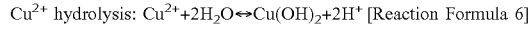

$Cu^{2+}$ hydrolysis: $Cu^{2+} + 2H_2O \leftrightarrow Cu(OH)_2 + 2H^+$     [Reaction Formula 6]

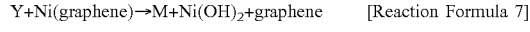

$Y + Ni(graphene) \rightarrow M + Ni(OH)_2 + graphene$     [Reaction Formula 7]

$Ni(OH)_2 + 2H^+ \leftrightarrow Ni^{2+} + 2H_2O$     [Reaction Formula 8]

(In reaction formula 7, Y represents $[AuCl_3(OH)]^-$, $[PtCl_5(OH)]^{2-}$, $AgOH$ and $Cu(OH)_2$.)

In $HAuCl_4$ and $H_2PtCl_6$ solutions, $Au^{3+}$ and $Pt^{4+}$ were hard to be generated from $[AuCl_4]^-$ and $[PtCl_6]^{2-}$ due to their high coordination ability. Instead, $[AuCl_3(OH)]^-$ and $[PtCl_5(OH)]^{2-}$ complexes were easily generated by hydrolysis (reaction formula 3 and reaction formula 4). As shown in reaction formula 5 and reaction formula 6, AgOH ($K_{sp}$ (solubility product constant)=$2.0 \times 10^{-6}$) and $Cu(OH)_2$ ($K_{sp}$=$2.2 \times 10^{-20}$) compounds were produced from $Ag^+$ and $Cu^{2+}$ by hydrolysis. Y complex contained the metal ions $M^{x+}$ and $OH^-$, and $M^{x+}$ was easily reduced by receiving electrons from the graphene layer as shown in reaction formula 7, while $OH^-$ was released according to reaction formula 7. Free electrons were accumulated in the graphene layer (FIG. 7c), where the Y complex ($M^{x+}$) received electrons and was reduced to metal at super-fast reaction rate. At the same time, high concentration of $OH^-$ and $Ni^{2+}$ were generated near the interface. $Ni^{2+}$ ions were released from the gap of the nickel surface in the graphene region and then generate $Ni(OH)_2$ sheets by reacting with $OH^-$. Exceptionally, the formation of $Ni(OH)_2$ was difficult during the Cu deposition described in the experiments below. Along with electron consumption in the graphene layer, electrons were supplied by oxidation of nickel. Electrons were continuously transferred from nickel to graphene in order to maintain charge balance in EDL (FIG. 7c). Metaphorically speaking, the said EDL plays an electron pump supplying electrons enough to drive redox reaction at a high rate (FIG. 21).

To confirm the hypothetical reaction mechanism, $HAuCl_4$, $H_2PtCl_6$, $AgNO_3$ and $CuSO_4$ solutions were prepared at different concentrations of 0.125 mM, 0.25 mM, 0.45 mM and 0.6 mM according to the decrease of oxidizing ability, which were used for the investigation of metal deposition on GNF (FIG. 8). During the first 1 hour, GNF was covered with metal and $Ni(OH)_2$ sheet (FIGS. 8a, 8d and 8g). Interestingly, 2 hours later, the $Ni(OH)_2$ sheet was completely disappeared and thus the growth of nanoparticles was clearly observed in Au and Pt (FIG. 8b and FIG. 8e), which continued to grow to form a thicker layer on GNF after 4 hours (FIG. 8c and FIG. 8f). However, in the case of silver, the $Ni(OH)_2$ nanosheet was not dissolved in $AgNO_3$ solution because of the weak acidity of the solution and instead remained on Ag flake a lot (FIG. 8h and FIG. 8i). $HAuCl_4$ and $H_2PtCl_6$ demonstrated higher oxidability than $AgNO_3$ and $CuSO_4$. Therefore, the fast consumption of $[AuCl_3(OH)]^-$ and $[PtCl_5(OH)]^{2-}$ complexes was able to maintain a high concentration of $OH^-$ near the graphene and a high concentration of $Ni^{2+}$ near the nickel surface. $Ni^{2+}$ ions were combined with $OH^-$ ions to produce a $Ni(OH)_2$ sheet. Then, as shown in reaction formula 8, the $Ni(OH)_2$ was slowly dissolved in the solution above. $Cu^{2+}$ displayed the weakest oxidability among the metal ions above, indicating $Cu^{2+}$ showed the lowest deposition rate. $Cu(OH)_2$ had a very small solubility constant so that it was not able to produce high concentration $OH^-$ near the GNF surface. Therefore, $Ni(OH)_2$ was hardly observed due to the low concentration of $OH^-$ and $Ni^{2+}$, and only typical cubic box-like. Cu nanoparticles were grown individually on GNF (FIG. 8k and FIG. 8l).

Figure 9A:
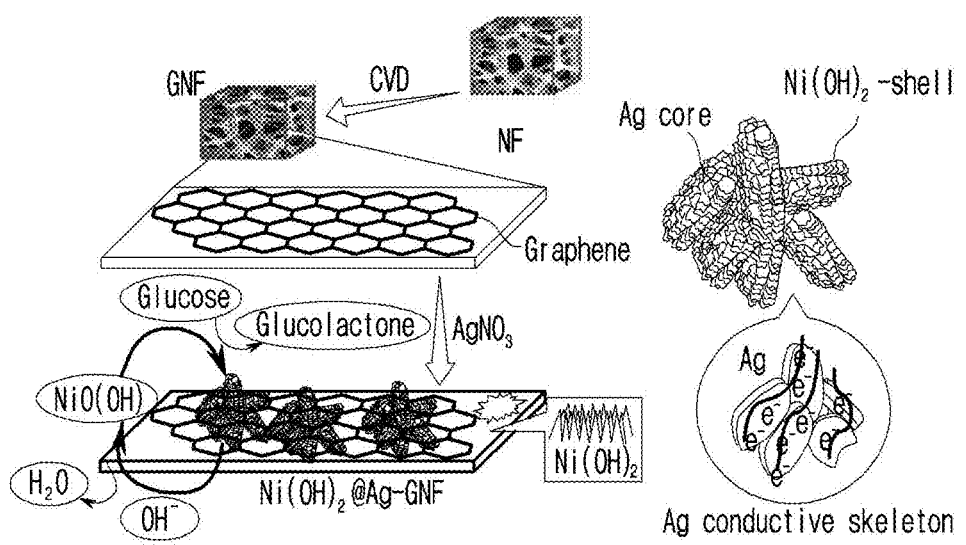
FIG. 9a present a schematic diagram of the direct formation process of Ag@Ni(OH)2 on GNF according to an example of the present invention and the hierarchical structure of an electrode for the glucose sensor.
Figure 9B:
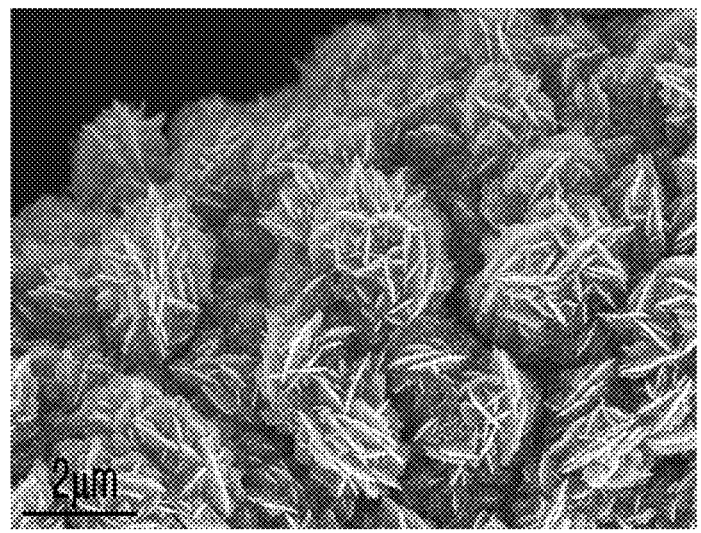
FIG. 9b present a SEM image of Ag@Ni(OH)2-GNF prepared by using 0.45 mM AgNO3 4 hours after the deposition.
Figure 9C:
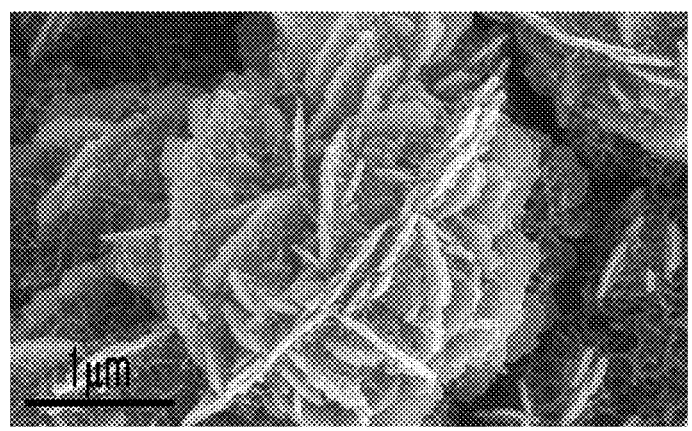
FIG. 9c present an enlarged SEM image of FIG. 9b.
Figure 9D:
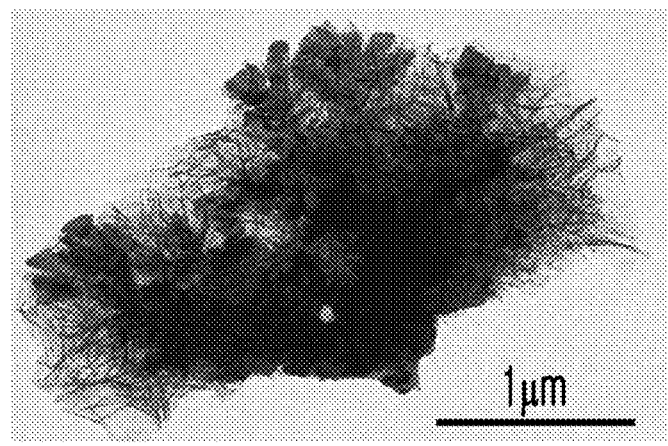
FIG. 9d present a TEM image of Ag wrapped by Ni(OH)2.
Figure 10A:
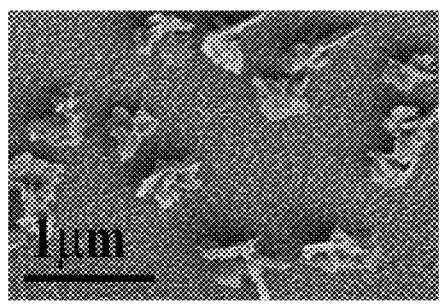
FIG. 10a is a SEM image of the Ag@Ni(OH)2 formed on GNF prepared by using 0.45 mM AgNO3 for 1 hour according to an example of the present invention.
Figure 10B:
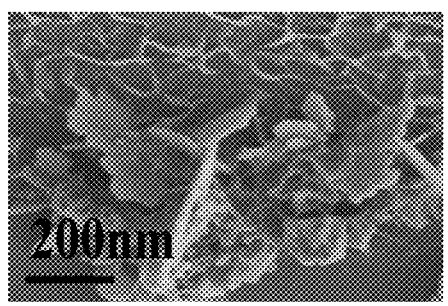
FIG. 10b is a SEM image of the Ag@Ni(OH)2 formed on GNF prepared by using 0.45 mM AgNO3 for 1 hour according to an example of the present invention.
Figure 10C:
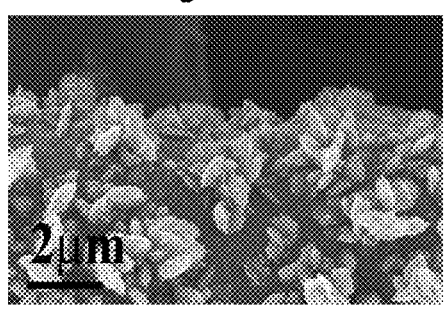
FIG. 10c is a SEM image of the Ag@Ni(OH)2 formed on GNF prepared by using 0.45 mM AgNO3 for 2 hour according to an example of the present invention.
Figure 10D:
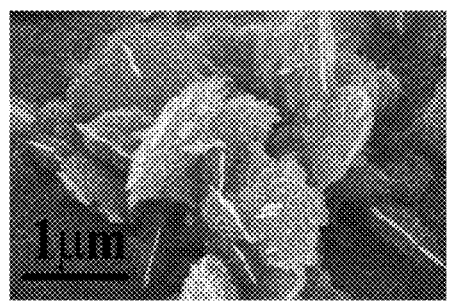
FIG. 10d is a SEM image of the Ag@Ni(OH)2 formed on GNF prepared by using 0.45 mM AgNO3 for 2 hour according to an example of the present invention.
Figure 10E:
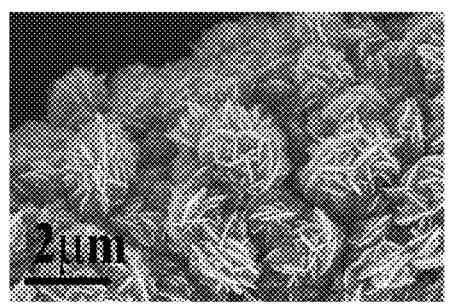
FIG. 10e is a SEM image of the Ag@Ni(OH)2 formed on GNF prepared by using 0.45 mM AgNO3 for 4 hour according to an example of the present invention.
Figure 10F:
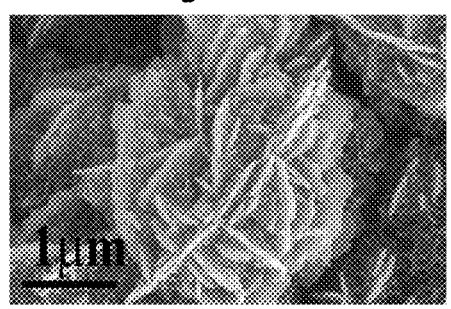
FIG. 10f is a SEM image of the Ag@Ni(OH)2 formed on GNF prepared by using 0.45 mM AgNO3 for 4 hour according to an example of the present invention.
Figure 10G:
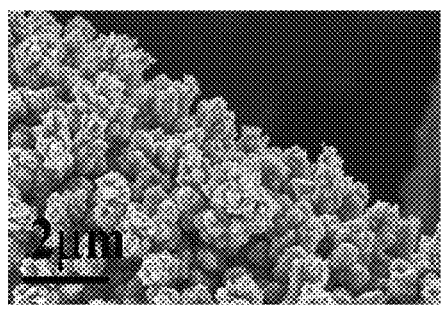
FIG. 10g is a SEM image of the Ag@Ni(OH)2 formed on GNF prepared by using 0.45 mM AgNO3 for 6 hour according to an example of the present invention.
Figure 10H:
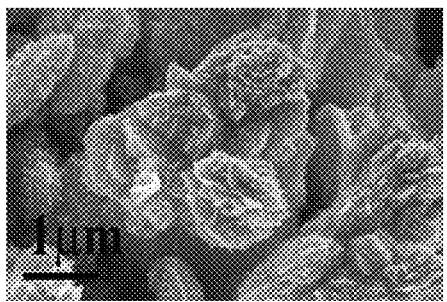
FIG. 10h is a SEM image of the Ag@Ni(OH)2 formed on GNF prepared by using 0.45 mM AgNO3 for 6 hour according to an example of the present invention.
Figure 11:
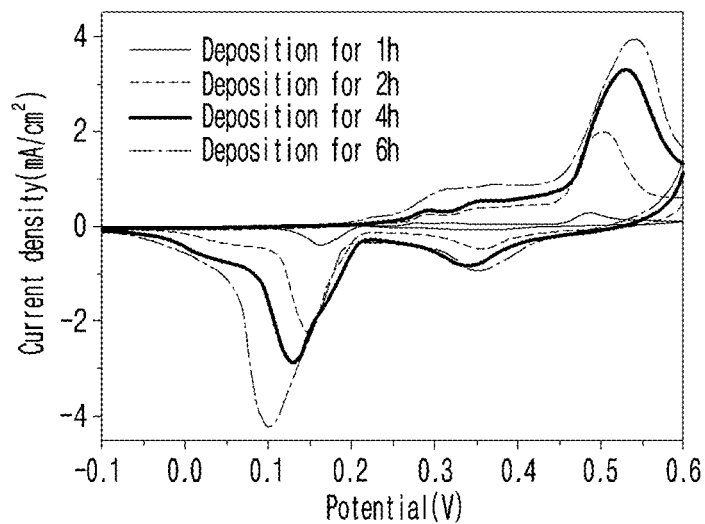
FIG. 11 is a graph showing the CVs of the Ag@Ni(OH)2-GNF samples each formed by different deposition times at a scan rate of 2 mV/s in 0.1 M NaOH electrolyte according to an example of the present invention.

<4-2> Application of $Ag@Ni(OH)_2$-GNF Electrode to Non-Enzymatic Glucose Sensing As shown schematically in FIG. 9a, Ag covered by self-assembled $Ni(OH)_2$ was grown on GNF by the simple treatment of silver nitrate solution. Structurally, the internal Ag-conductive framework has a great advantage in collecting the electrons generated in the $Ni(OH)_2$ shell. The obtained $Ag@Ni(OH)_2$ nano hybrid structure is presented in FIG. 9b. The irregular Ag nanoplate was layered together and formed a flower-like structure surrounded by the porous $Ni(OH)_2$ nanosheet (FIG. 9c). The Ag core encapsulated by $Ni(OH)_2$ nanosheet was clearly observed in TEM image presented in FIG. 9d. The formation of a hierarchical flower-like structure of $Ag@Ni(OH)_2$ hybrid was studied according to the different deposition times (FIG. 10). Ag formed an individual sheet-like structure within the first hour, and then more silver nanoplates were formed and continued to grow. At last, the individual Ag nanoplates were connected each other to form a flower-like framework (FIG. 10a to FIG. 10f). In the meantime, the $Ni(OH)_2$ nanosheets were crystallized on the surface of each Ag flake to form a porous structure. Six hours later, a very thick $Ag@Ni(OH)_2$ complex layer was formed (FIG. 10g and FIG. 10h). However, it has been found that some active materials come off easily from the GNF substrate during washing because they are too agglomerated physically. So, the $Ag@Ni(OH)_2$ hybrid deposited for 4 hours was used for all the electrochemical tests since the hybrid not only exhibited a higher peak current, but also contained a proper amount of active materials strongly attached on the GNF substrate (FIG. 11).

Figure 12:
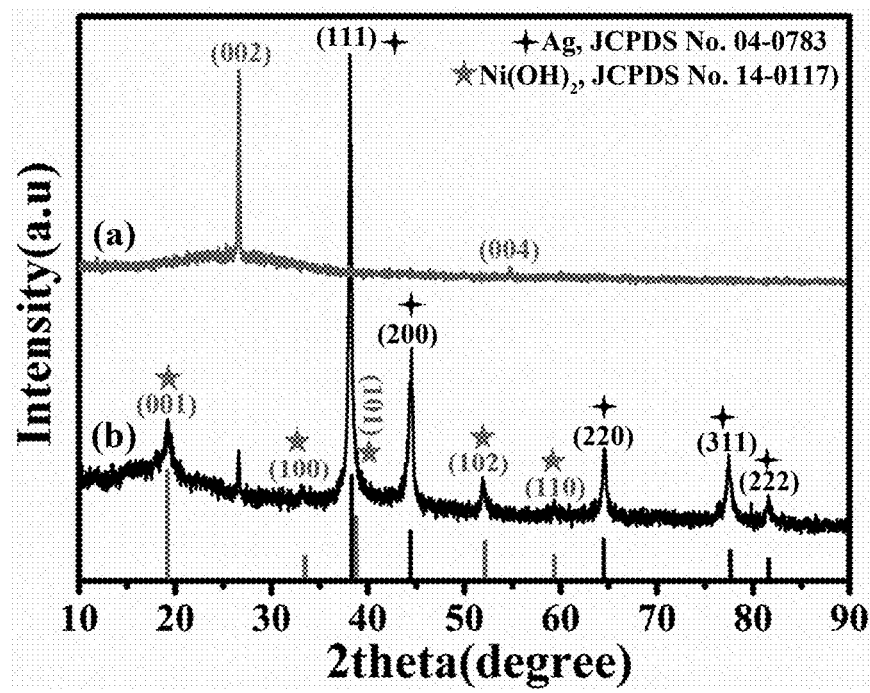
FIG. 12 is a graph showing the XRD patterns of the graphene foam (GF) (a) and Ag@Ni(OH)2 complex (b) separated from GNF by ultrasonication, according to an example of the present invention.
Figure 13A:
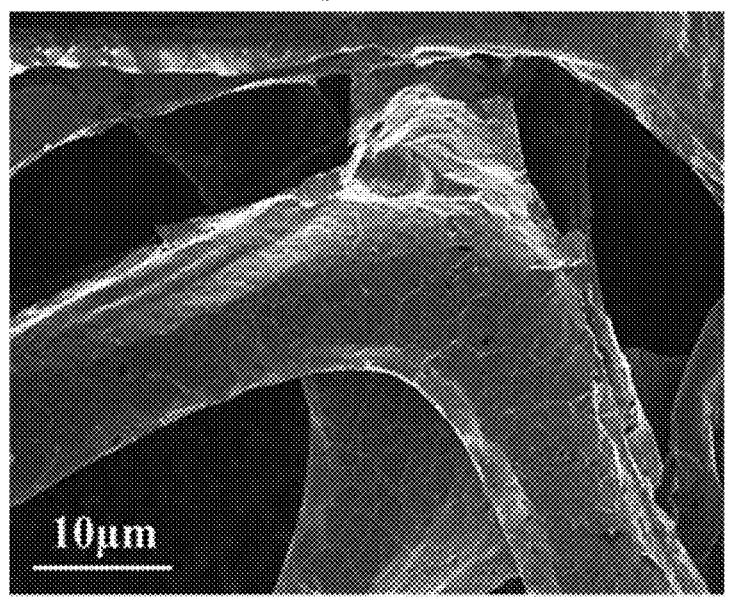
FIG. 13a present a SEM image of the graphene foam after removal of nickel by HCl according to an example of the present invention.
Figure 13B:
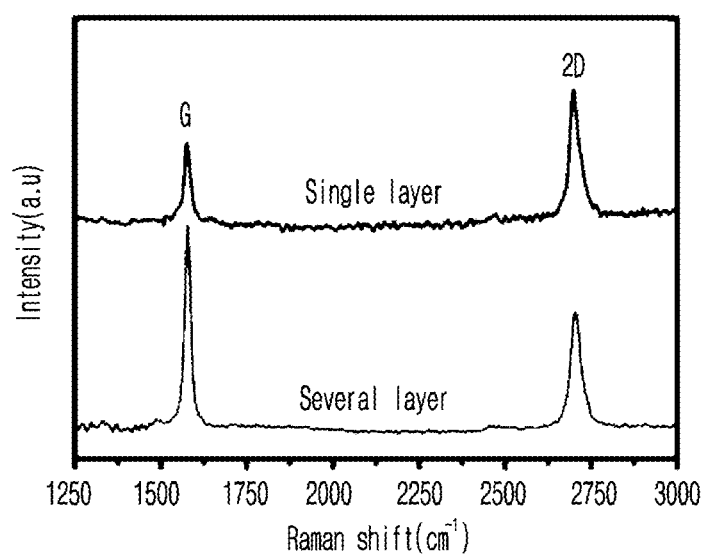
FIG. 13b present a Raman spectrum of the graphene foam.

The mixture of Ag and Ni(OH)$_2$ complex was confirmed by X-ray diffraction pattern (FIG. 12). All the diffraction peaks of Ni(OH)$_2$ and Ag (respectively JCPDS No. 14-0117 and JCPDS No. 04-0783) were well indexed, and a weak peak separately observed at 26.5° was originated from a small amount of graphene falling off from the nickel foam during high power sonication. The Ag@Ni(OH)$_2$ nanohybrid was able to be separated from the nickel foam by sonication. After eliminating nickel by using HCl, a freestanding graphene foam was observed (FIG. 13a). Raman spectra showed that the graphene foam was composed of a single layer to several graphene layers (FIG. 13b).

Figure 14A:
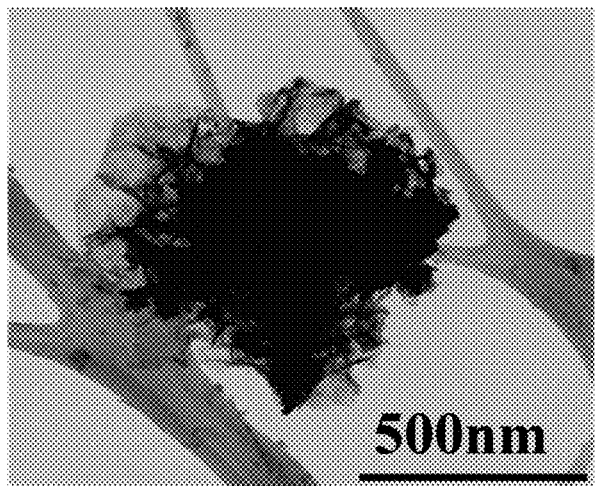
FIG. 14a present the result of elemental analysis of the Ag@Ni(OH)2 hybrid structure according to an example of the present invention.
Figure 14B:
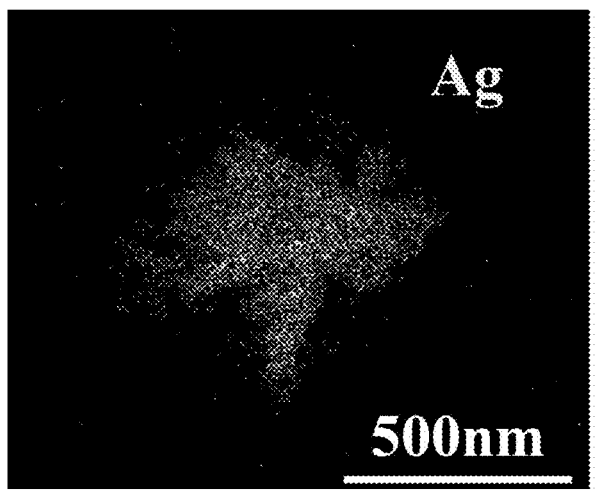
FIG. 14b present the result of elemental analysis of the Ag@Ni(OH)2 hybrid structure according to an example of the present invention.
Figure 14C:
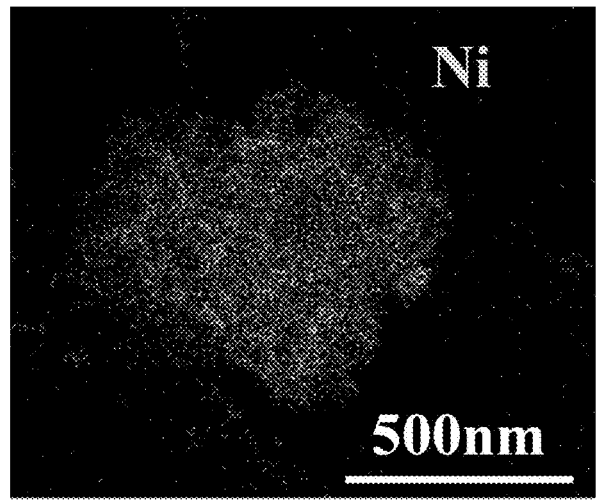
FIG. 14c present the result of elemental analysis of the Ag@Ni(OH)2 hybrid structure according to an example of the present invention.
Figure 14D:
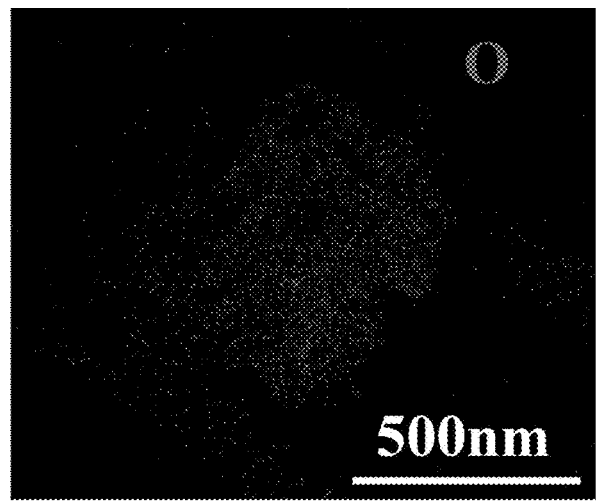
FIG. 14d present the result of elemental analysis of the Ag@Ni(OH)2 hybrid structure according to an example of the present invention.
Figure 15A:
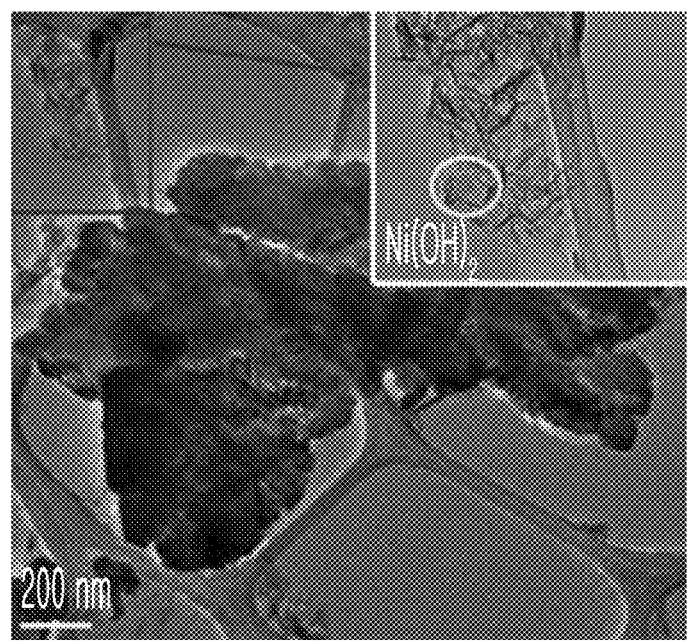
FIG. 15a present, according to an example of the present invention, HR-TEM images of porous Ni(OH)2 nanosheet.
Figure 15B:
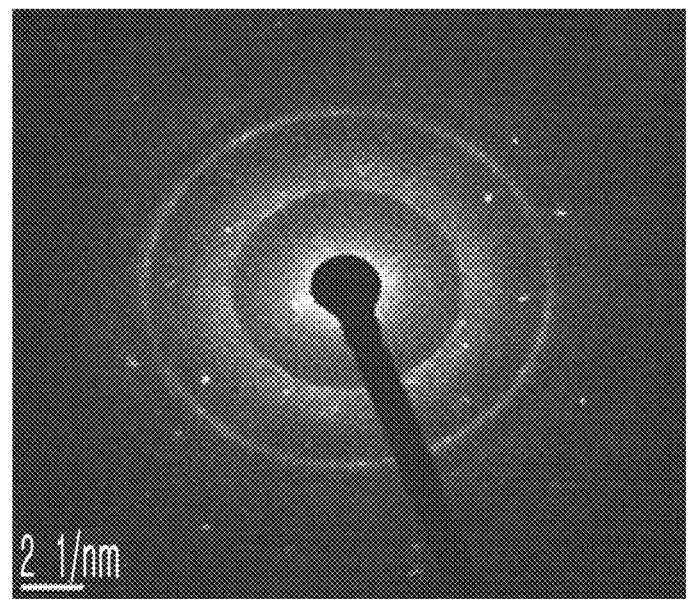
Figure 15C:
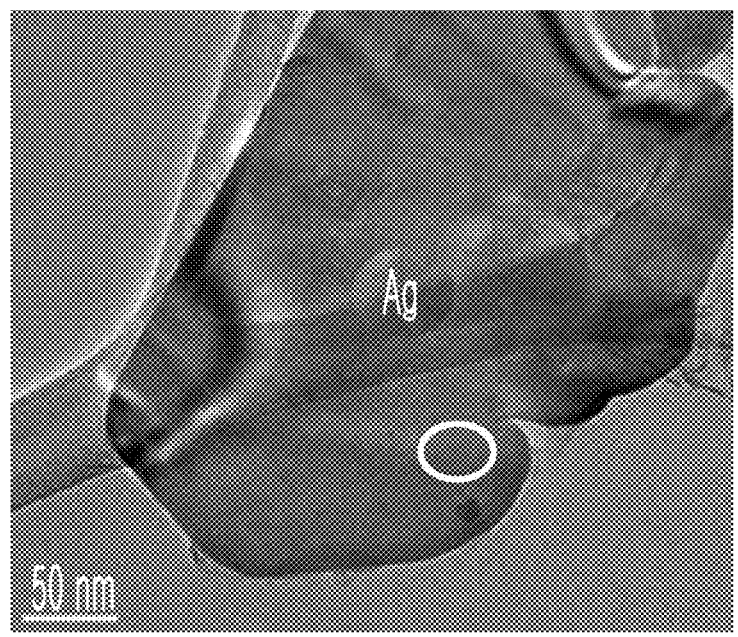
FIG. 15c present, according to an example of the present invention, HR-TEM images of Ag nanoplate.
Figure 15D:
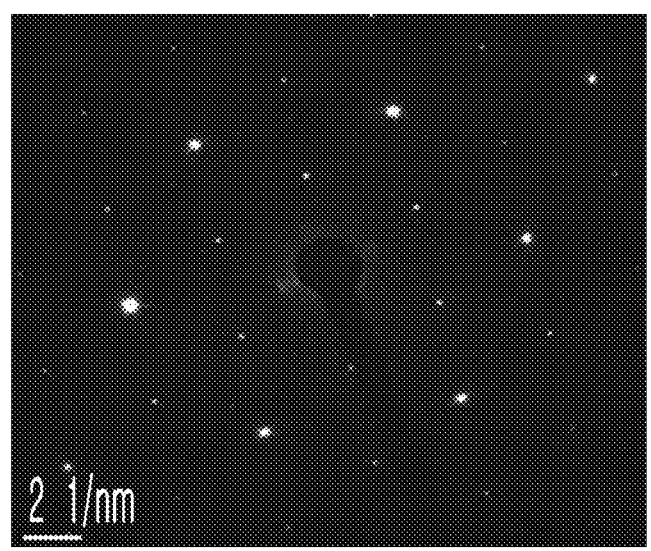
FIG. 15d present, according to an example of the present invention, SAED pattern corresponding to circle area of FIG. 15c.

Elemental analysis was performed to identify the coreshell structure of Ag@Ni(OH)$_2$. FIG. 14a shows the hybrid structure composed of an Ag core and a porous Ni(OH)$_2$ shell. The Ag signal matched the dark region inside of the complex (FIG. 14a and FIG. 14b). The Ni and O signals derived from Ni(OH)$_2$ were distributed in the whole region and the signals were getting weak in the surrounding region, which was consistent with the Ni(OH)$_2$ porous shell. A clear Ni(OH)$_2$ sheet and a silver flake structure were observed in HR-TEM images (FIG. 15a and FIG. 15c). The SAED pattern showed a polycrystalline structure of Ni(OH)$_2$ (FIG. 15b) and a high crystallinity of silver (FIG. 15d).

Ni(OH)$_2$ has been considered as an active material for non-enzymatic glucose sensing based on the following detection mechanism shown below:

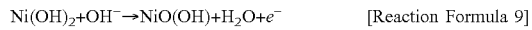
$$Ni(OH)_2 + OH^- \rightarrow NiO(OH) + H_2O + e^- \quad \text{[Reaction Formula 9]}$$

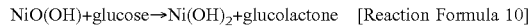
$$NiO(OH) + glucose \rightarrow Ni(OH)_2 + glucolactone \quad \text{[Reaction Formula 10]}$$

Figure 16A:
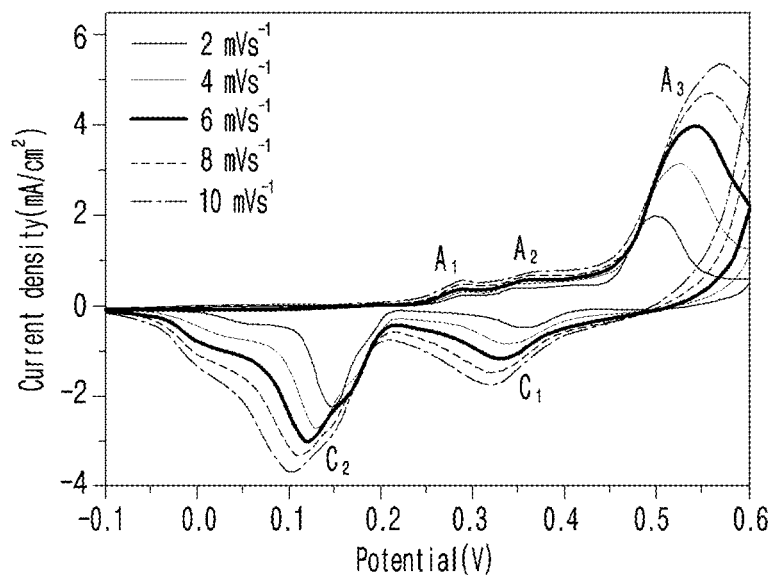
FIG. 16a present, according to an example of the present invention, CV-curves of Ag@Ni(OH)2-GNF according to different scan rates (2, 4, 6, 8 and 10 mV/s) in 0.1 M NaOH electrolyte.
Figure 16B:
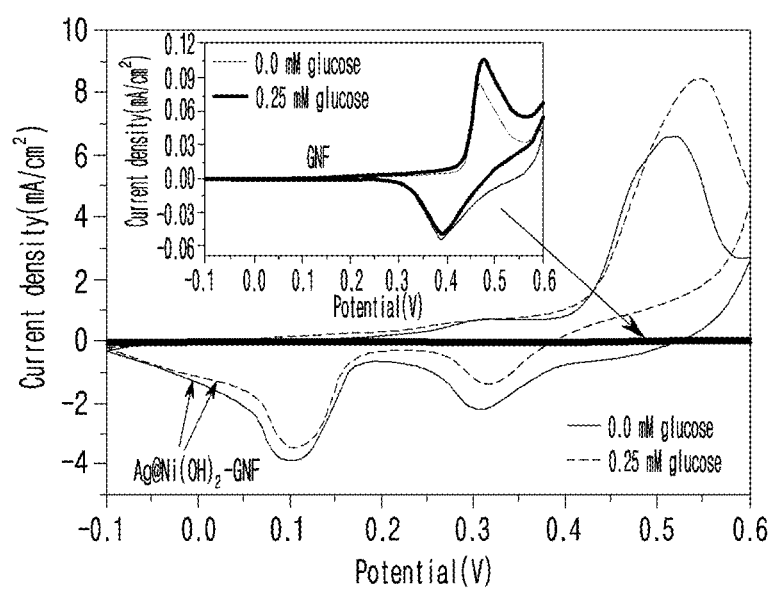
FIG. 16b present, according to an example of the present invention, CV-curves of Ag@Ni(OH)2-GNF and GNF (insert) in the absence or presence of 0.25 mM glucose (scan rate: 10 mV/s)
Figure 17:
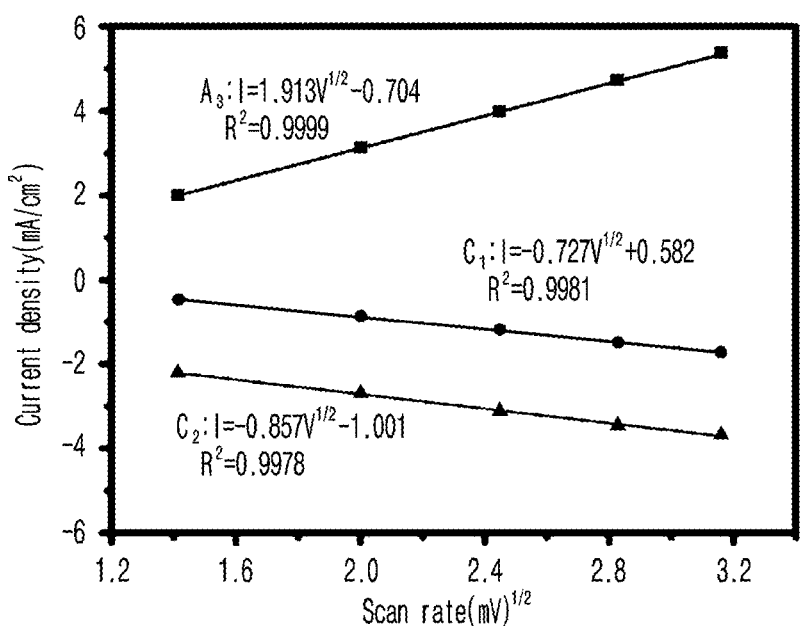
FIG. 17 is a graph showing the peak current plots of the redox peaks against the square root of scan rate in CVs shown in FIG. 16a, according to an example of the present invention.

Cyclic voltammetric curve showed three anode peaks at 0.29 V, 0.35 V and 0.52 V in glucose free 0.1 M NaOH solution at a scanning rate of 2 mV/s (FIG. 16a). Two small oxidation peaks at 0.29 V and 0.35 V corresponded to the formation of Ag(I)-oxygen containing species and the strong and broad reduction peak at 0.15V was attributed to the reduction from Ag(I)-oxygen to Ag. A pair of redox peaks at 0.35V and 0.52V corresponded to $Ni^{3+}/Ni^{2+}$ redox pair (Reaction Formula 9). The potential turned positive as the scan rate increased by the electrode polarization, and the redox peak current was increased lineally by square root of the scan rate (FIG. 17). Glucose was oxidated to glucolactone by $Ni^{3+}$ (Reaction Formula 10), and the increased anodic current was observed (FIG. 16b). Reaction formula 9 shows the oxidation of Ni(OH)$_2$, which can be separated into two parts (one is the oxidation on a solid phase: $Ni(OH)_2 \rightarrow NiOOH + H^+ + e^-$, and the other is the oxidation on the interface of electrode/electrolyte: $H^+ + OH^- \rightarrow H_2O$). Thus, protons moved from the solid phase to the solid-liquid interface and bound to $OH^-$. If the slow electron transfer and the proton diffusion are interrupted, the sensitivity and reproducibility of the sensor would be reduced. However, the porous nanosheet structure of the Ag@Ni(OH)$_2$-GNF hybrid was able to provide a sufficient reaction interface between Ni(OH)$_2$ and electrolyte. The internally coordinated silver nanoplate was a good electron conductor, which enabled electron transfer from Ni(OH)$_2$ to the GNF substrate, and also contributed to high current response and high sensitivity.

Figure 16C:
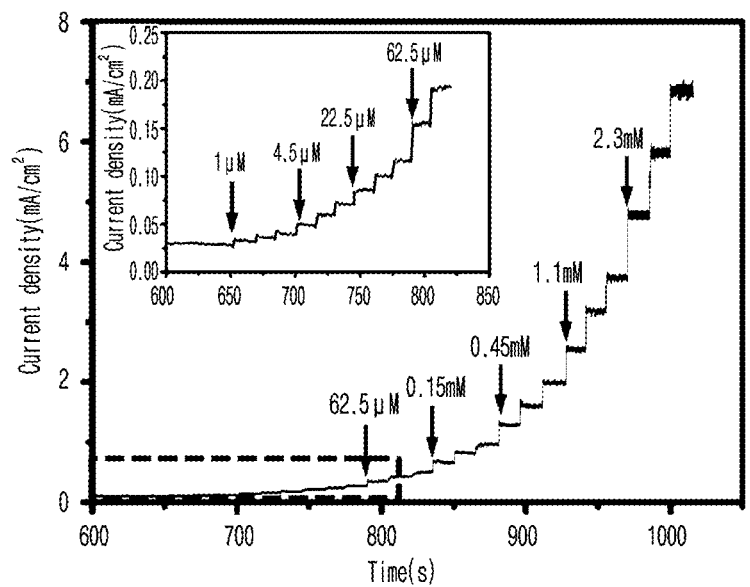
FIG. 16c present, according to an example of the present invention, a typical steady-state response of Ag@Ni(OH)2-GNF electrode according to a continuous injection of glucose into 0.1 M NaOH electrolyte stirred at a fixed potential of 0.55 V (The insertion curve comes from a green dash rectangle)
Figure 18A:
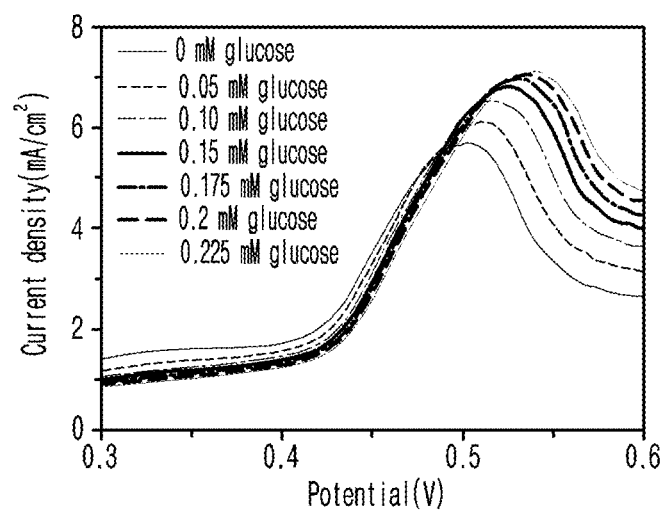
FIG. 18a presents LSV curves of Ag@Ni(OH)2-GNF electrode according to different glucose concentrations between 0-0.225 mM (scan rate: 10 mV/s)
Figure 18B:
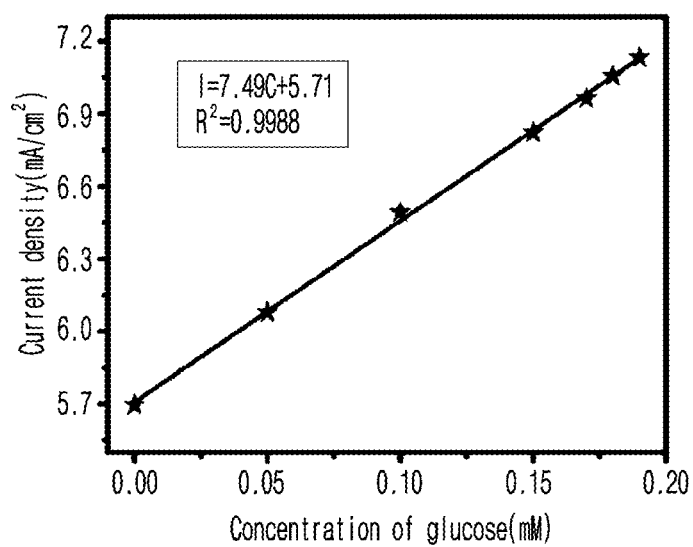
FIG. 18b present a calibration curve of the current density of the LSV curves obtained in FIG. 18a as a function of the glucose concentration.
Figure 19:
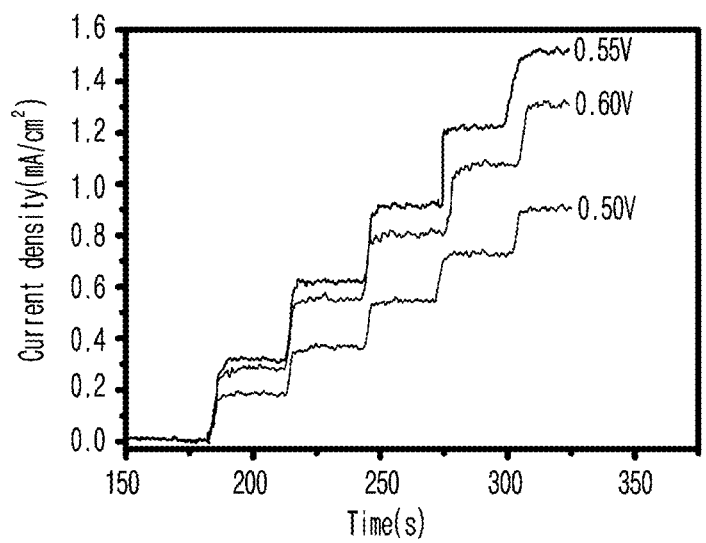
FIG. 19 is a graph showing the current measurement responses of Ag@Ni(OH)2-GNF at different potentials in 0.1 M NaOH with additions of 0.1 mM glucose, according to an example of the present invention.

As the glucose concentration continually increased, the oxidation peak current was gradually increased in the concentration range of 0.05 mM to 0.225 mM according to the increase of the glucose concentration (FIG. 18a). The increase was also linearly proportional (FIG. 18b). Changes in the current density intensity were observed by adding 0.1 mM glucose to 0.1 M NaOH continuously at three different potentials (0.5 V, 0.55 V and 0.6 V) (FIG. 19). Of the three potentials, 0.55 V was observed to exhibit the strongest current response. To evaluate the sensitivity of Ag@Ni(OH)$_2$-GNF, a current measurement response to the glucose concentration of 0.1 M NaOH at a fixed potential of 0.55 V was investigated (FIG. 16c). Nearly 98% of the steady-state current was accomplished within 3 seconds of glucose addition, indicating quick response of the sensor was achieved. A stable current response was observed when glucose was continuously added to the stirred 0.1 M NaOH solution at different concentration at time intervals of 30 seconds. Also, significantly different current measurement stages were observed according to the changes of glucose concentration.

Figure 20:
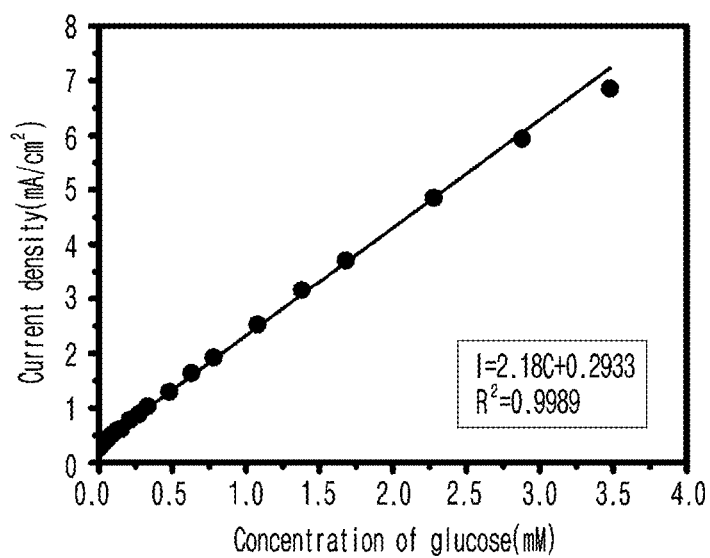
FIG. 20 is a graph showing the typical steady-state response curve of Ag@Ni(OH)2-GNF electrode according to a continuous injection of glucose shown in FIG. 16c at the applied potential of 0.55 V.
Figure 21A:
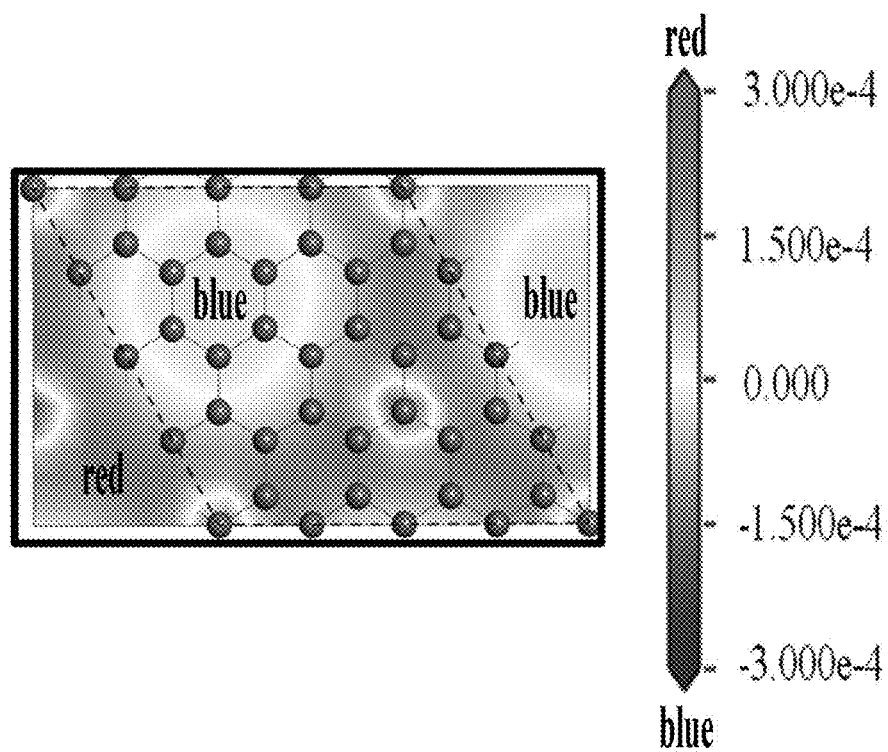
FIG. 21a is a photograph showing the electron density rearrangement structure of each graphene layer of the model 1 comprising a single graphene layer.
Figure 21B:
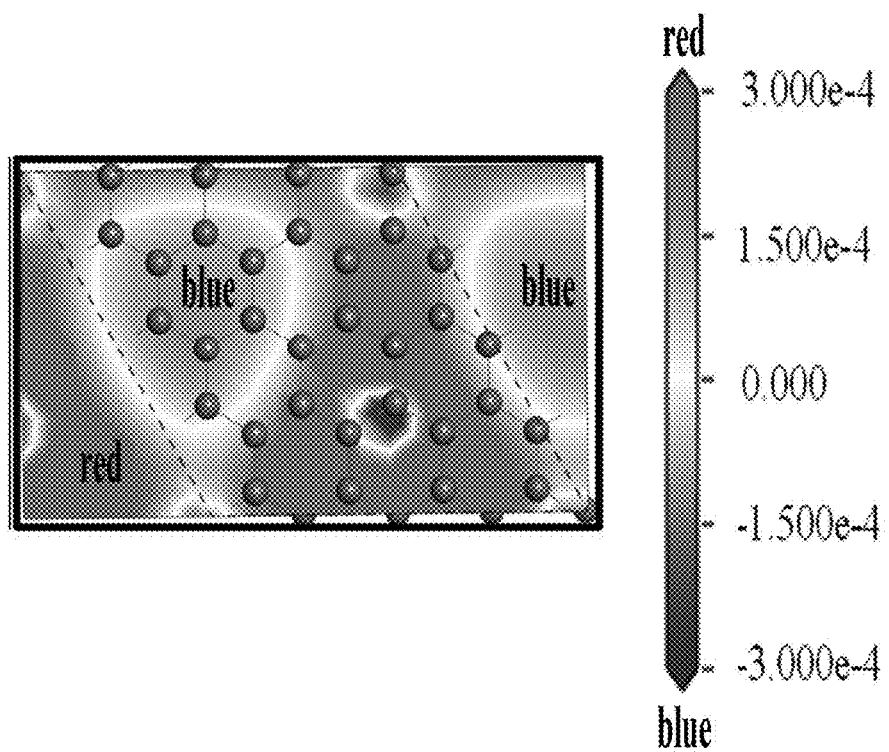
FIG. 21b is a photograph showing the electron density rearrangement structure of 1 graphene layer of the model II comprising 5 graphene layers.
Figure 21C:
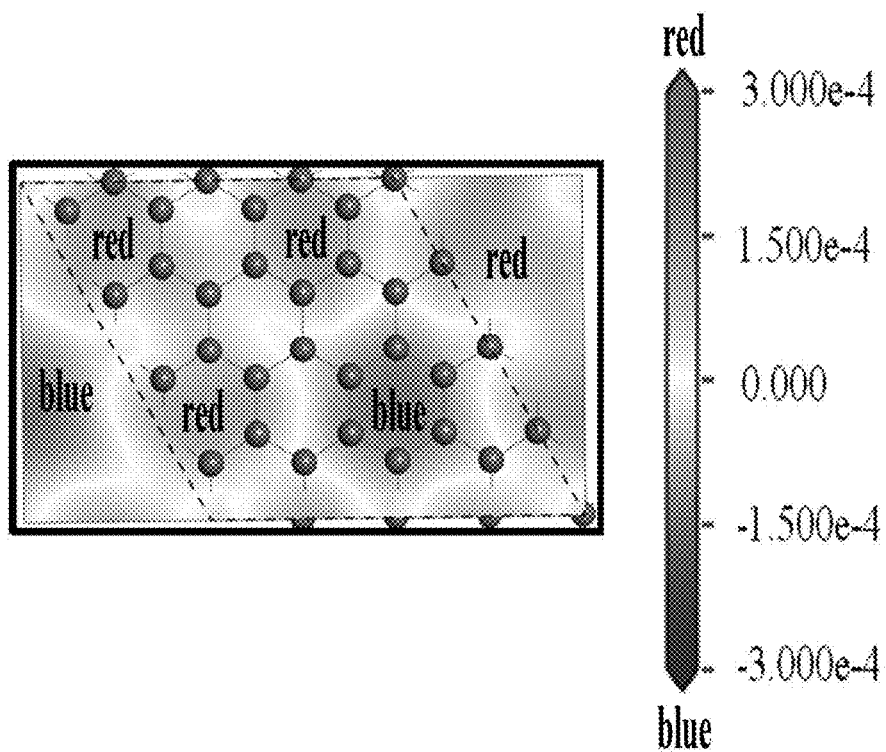
FIG. 21c is a photograph showing the electron density rearrangement structure of 2 graphene layer of the model II comprising 5 graphene layers.
Figure 21C:
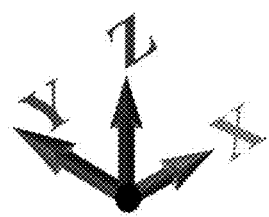
Figure 21D:
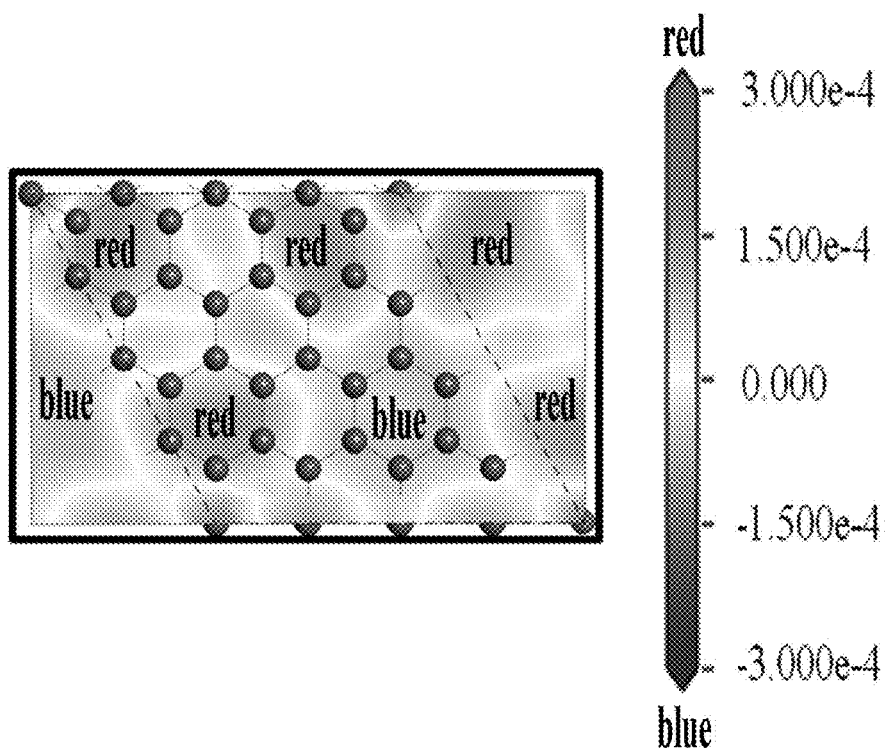
FIG. 21d is a photograph showing the electron density rearrangement structure of 3 graphene layer of the model II comprising 5 graphene layers.
Figure 21E:
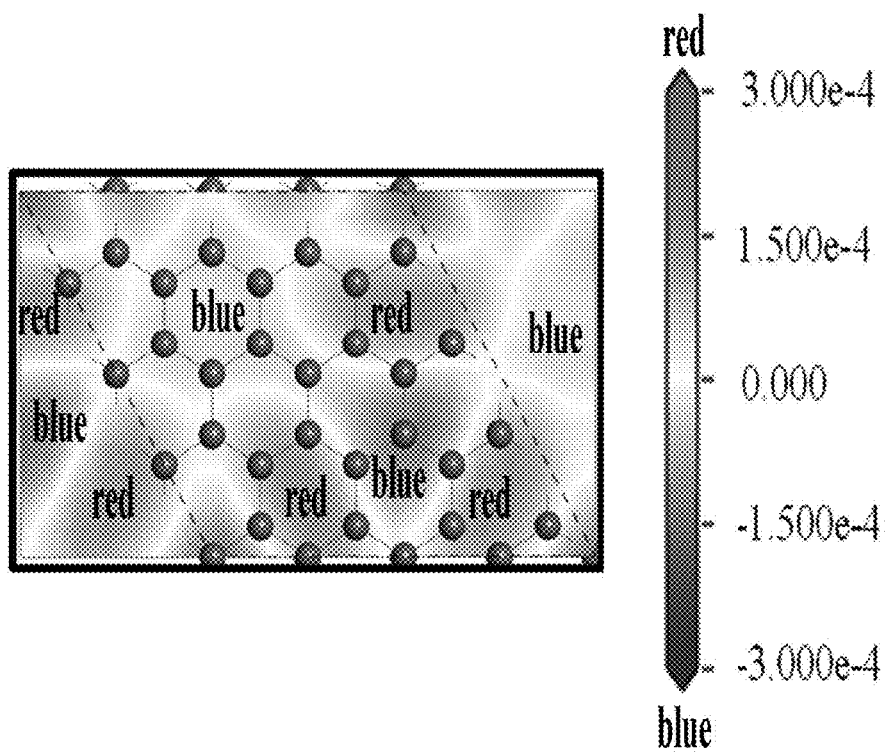
FIG. 21e is a photograph showing the electron density rearrangement structure of 4 graphene layer of the model II comprising 5 graphene layers.
Figure 21E:
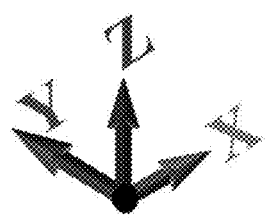
Figure 21F:
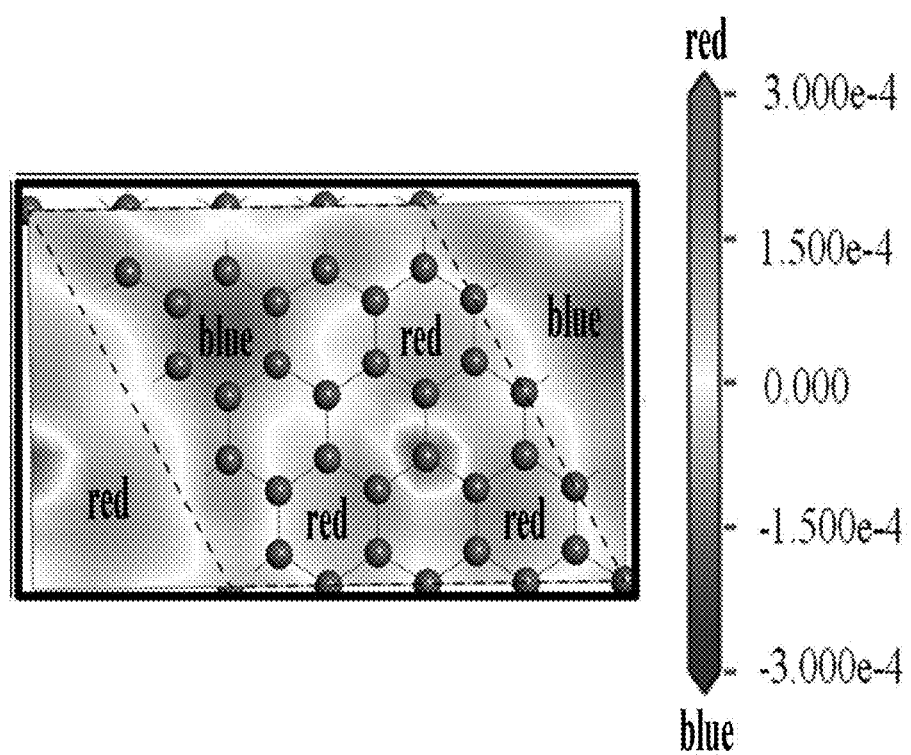
FIG. 21f is a photograph showing the electron density rearrangement structure of 5 graphene layer of the model II comprising 5 graphene layers.
Figure 21F:
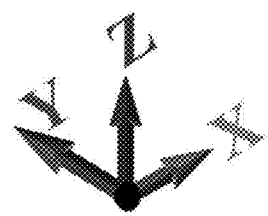
Figure 21G:
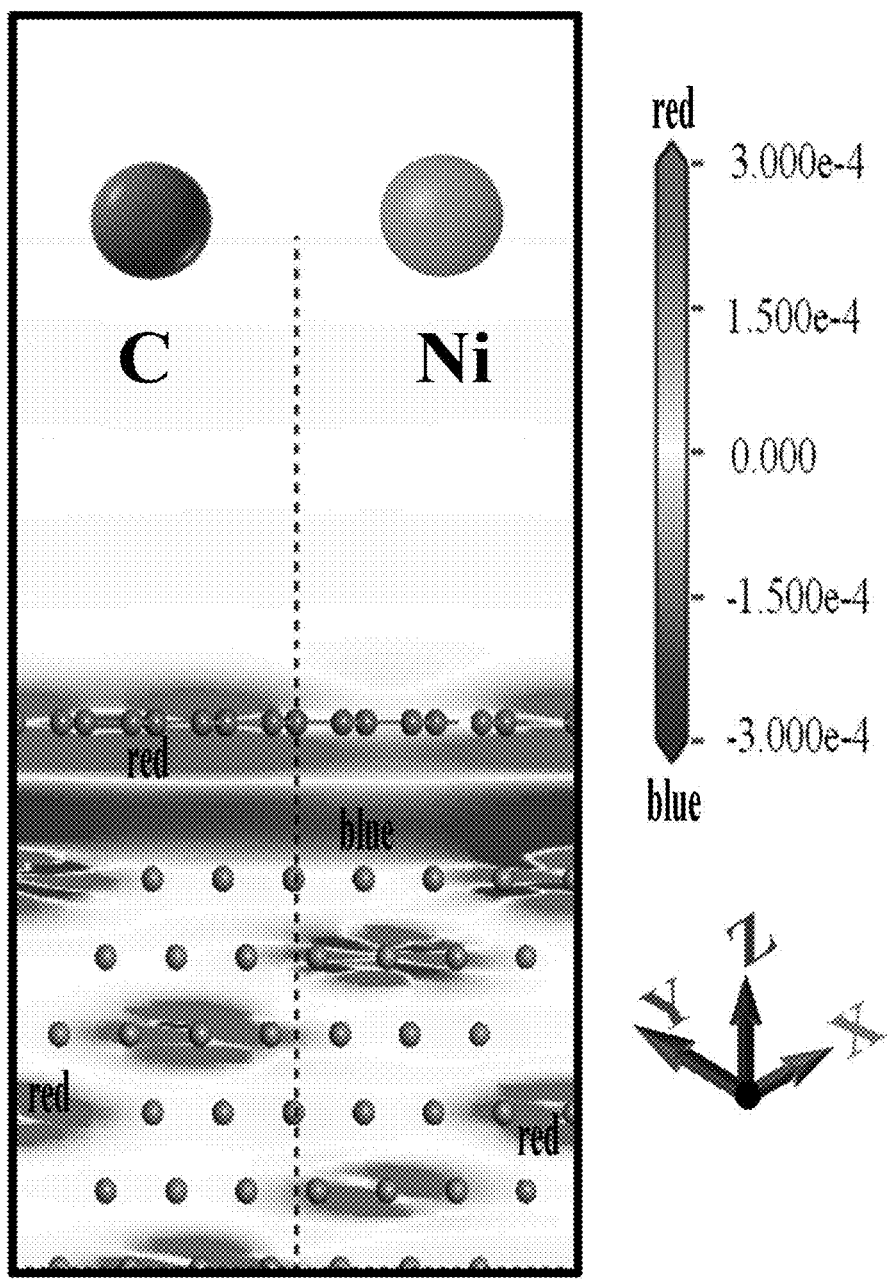
FIG. 21g is a photograph showing the electron density rearrangement in the cross section (electric double layer or interfacial dipole) of model 1.
Figure 21H:
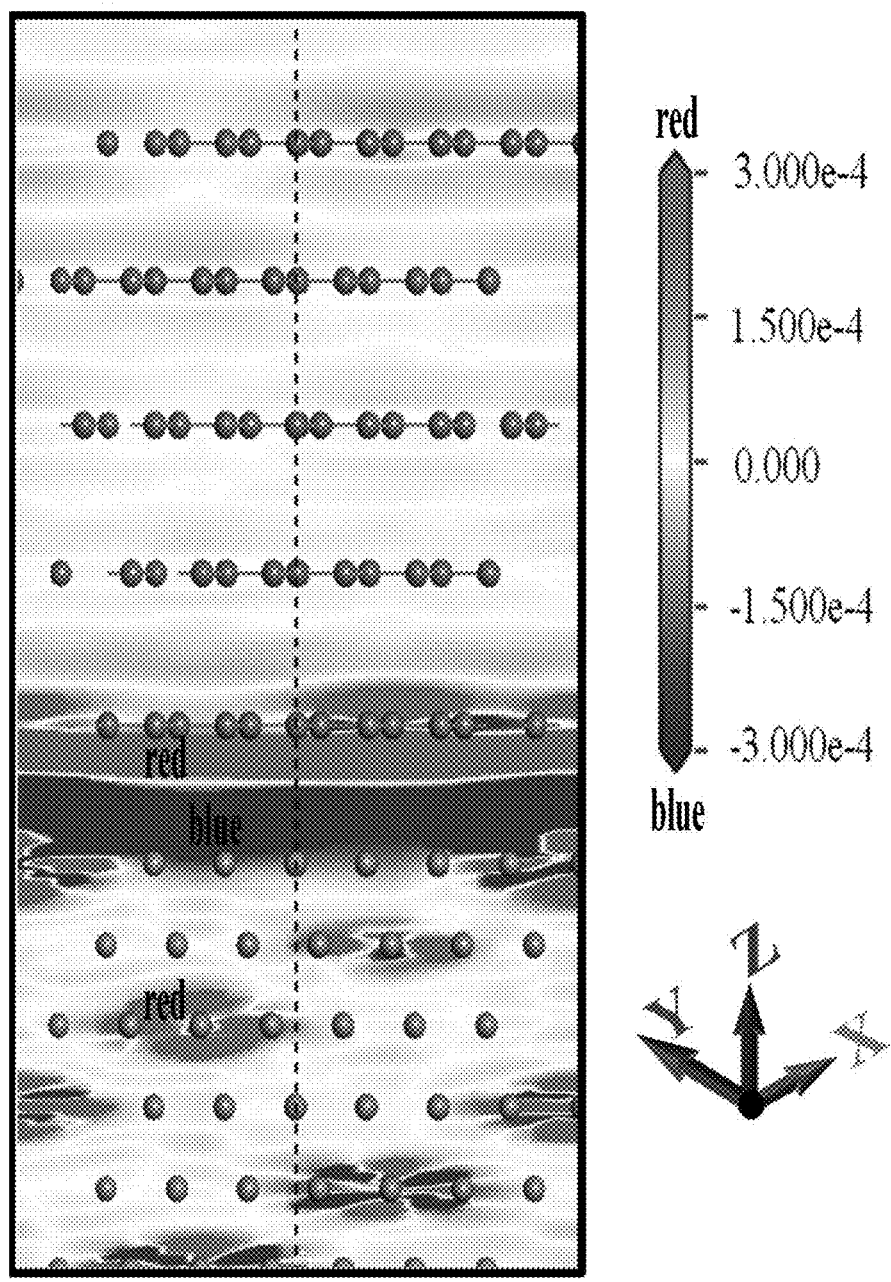
FIG. 21h is a photograph showing the electron density rearrangement in the cross section (electric double layer or interfacial dipole) of model II.

FIG. 20 presents the calibration curve of Ag@Ni(OH)$_2$-GNF electrode, wherein an excellent linear relationship between glucose concentration and response current signal is shown at a wide range of glucose concentration from 0.6 μM to 3.5 mM ($R_2$=0.9989), and a very high sensitivity of 2,180 μA/cm$^2$ mM and a low detection limit of 0.3 μM (signal noise=3) are shown. This was one of the samples exhibiting the best performance among the Ni(OH)$_2$-based glucose sensors, and the performance is shown in Table 1 below.

TABLE 1

| Glucose sensor | Linear range (mM) | Detection limit (μM) | Sensitivity (μAcm$^{-2}$mM$^{-1}$) | Reference |
| --- | --- | --- | --- | --- |
| α-Ni(OH)$_2$/FTO | 0.01-0.75 | 3 | 446 | 1 |
| PI/CNT-Ni(OH)$_2$/GCE | 0.01-0.8 | 0.36 | 2071.5 | 2 |
| Ni(OH)$_2$ nanoplates/GCE | 0.002-3.1 | 0.6 | 11.43 | 3 |
| Ni(OH)$_2$ nanoboxes/GCE | 0.0005-5 | 0.07 | 487.3 | 4 |
| Platelet Ni(OH)$_2$/GCE | 0.05-23 | 6 | 202 | 5 |
| Ni(OH)$_2$/NPGF | 0.002-7 | 0.73 | 3529 | 6 |
| Ni(OH)$_2$/EGRO-MWNT/GCE | 0.01-1.5 | 2.7 | 2042 | 7 |
| Macro-mesoporous Ni(OH)$_2$/GCE | 0.01-8.3 | 1 | 243 | 8 |
| Ni(OH)$_2$/3D graphene foam | 0.001-1.17 | 0.34 | 2650 | 9 |
| Ag@Ni(OH)$_2$-GNF | 0.001-3.5 | 0.3 | 2180 | This work |

Figure 16D:
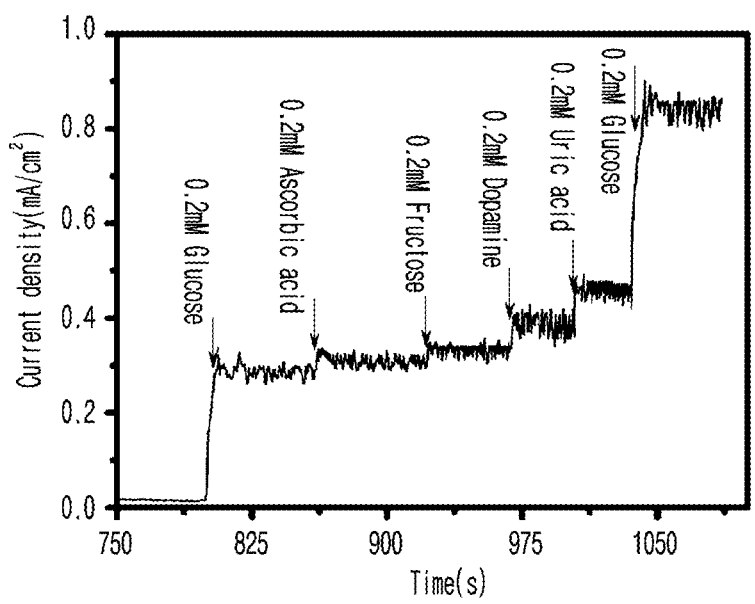
FIG. 16d present, according to an example of the present invention, a current measurement response of Ag@Ni(OH)2-GNF electrode according to the stepwise addition of 0.2 mM glucose, ascorbic acid (AA), fructose, dopamine, and uric acid (UA) and a current measurement response after the addition of 0.2 mM glucose.

The high sensitivity has been a major challenge for the non-enzymatic glucose sensor because there are various other molecules such as ascorbic acid (AA), fructose and uric acid (UA) in human blood in addition to glucose. Ag@Ni(OH)$_2$-GNF demonstrated the highest current in the presence of glucose compared to the same concentration of AA, UA, fructose and dopamine (In fact, these are included in human blood 30 times lower than glucose), which was almost 40 times, 6 times, 20 times and 7 times higher, respectively, as shown in FIG. 16d. The hybrid sensor exhibited an excellent repeatability with a remarkable current increase after the addition of 0.4 mM glucose when an interfering compound was present. The high selectivity and sensitivity of the Ag@Ni(OH)$_2$-GNF hybrid can be favorably obtained from the unique Ag@Ni(OH)$_2$ core-shell structure that can accelerate electrochemical reactions at the solid-liquid interface. This unique structure improved the electrochemical activity of Ni(OH)$_2$ for glucose sensing. Therefore, the excellent properties of Ag@Ni(OH)$_2$-GNF described above proved that it can be applied to various fields of sensors and electrochemical and photochemical electrodes.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. An electrode composing:
   a substrate including a graphene layer coated on a first metal; and
   a complex comprising a second metal deposited on the substrate and a hydroxide of the first metal, wherein the complex includes a plurality of core-shell structures in which the second metal is a core and the hydroxide of the first metal is a shell, the core of each of the plurality of core-shell structures being isolated by the shell from the cores of other core-shell structures, and the second metal has a higher standard reduction potential than the first metal.

2. The electrode according to claim 1, wherein the first metal includes a metal selected from the group consisting of nickel (Ni), copper (Cu), cobalt (Co), iron (Fe), and combinations thereof.

3. The electrode according to claim 1, wherein the second metal is a transition metal of group 10 or group 11 of the periodic table.

4. The electrode according to claim 3, wherein the second metal includes a metal selected from the group consisting of gold (Au), platinum (Pt), silver (Ag), copper (Cu), and combinations thereof.

5. The electrode according to claim 1, wherein the substrate has an electric double layer or interfacial dipole structure composed of the first metal and the graphene layer.

6. The electrode according to claim 1, wherein a content of the graphene layer is 0.1 weight part to 0.5 weight part by 100 weight part of the first metal.

7. The electrode according to claim 1, wherein a content of the hydroxide of the first metal is 20 weight part to 50 weight part by 100 weight part of the second metal.

8. The electrode according to claim 1, wherein a content of the complex is 2 weight part to 10 weight part by 100 weight part of the substrate.

9. The electrode according to claim 1, wherein the hydroxide of the first metal is a porous nanosheet.

10. A sensor for detecting glucose comprising the electrode of claim 1.

11. The electrode according to claim 1, wherein the plurality of core-shell structures include a flower-like structure.

12. A method for preparing an electrode comprising:
    forming a substrate by coating a graphene layer on a first metal (step 1); and immersing the substrate in a second metal precursor solution to deposit a complex comprising the second metal and a hydroxide of the first metal on the substrate (step 2), wherein the complex includes a plurality of core-shell structures in which the second metal is a core and the hydroxide of the first metal is a shell, the core of each of the plurality of core-shell structures being isolated by the shell from the cores of other core-shell structures, and the second metal has a higher standard reduction potential than the first metal.

13. The method for preparing an electrode according to claim 12, wherein the coating of the graphene layer in step 1 is performed by chemical vapor deposition (CVD) or liquid coating.

14. The method for preparing an electrode according to claim 12, wherein the deposition in step 2 is performed for 1 to 6 hours.

* * * * *